United States Patent [19] [11] 3,973,942
Coen et al. [45] Aug. 10, 1976

[54] METHOD OF MOULDING AND TEMPERING GLASS ARTICLES

[75] Inventors: Ernesto Coen, Southport; Joseph Parry, Lowton; Robin Charles Steere, Ormskirk, all of England

[73] Assignee: Pilkington Brothers Limited, St. Helens, England

[22] Filed: Apr. 4, 1975

[21] Appl. No.: 565,223

Related U.S. Application Data

[63] Continuation of Ser. No. 406,851, Oct. 16, 1973, abandoned.

[30] Foreign Application Priority Data

Oct. 20, 1972 United Kingdom............... 48446/72
May 16, 1973 United Kingdom............... 23379/73

[52] U.S. Cl. .................................. 65/83; 65/116; 65/69
[51] Int. Cl.² ................................... C03B 11/00
[58] Field of Search ................. 65/68, 69, 116, 117, 65/114, 83, 84, 85, 308, 309

[56] References Cited
UNITED STATES PATENTS 2,146,224  2/1939  Phillips .............................. 65/116
3,291,588  12/1966  Lippmann et al. .................. 65/85 X

FOREIGN PATENTS OR APPLICATIONS 527,296  9/1954  Belgium .............................. 65/114

OTHER PUBLICATIONS

Glass Engineering Handbook, pp. 19–22, by E. B. Shand, 2nd Ed., McGraw-Hill Book Co. Inc., N.Y., N.Y., 1958.

Primary Examiner—Arthur D. Kellogg
Attorney, Agent, or Firm—Burns, Doane, Swecker & Mathis

[57] ABSTRACT

A glass article is moulded by supplying a gob of molten glass to a mould, regulating the temperature of the mould and the time of closure of the mould so that when moulding is complete the surface viscosity of the glass is at mmost $10^{10.5}$ poises and the viscosity at the centre of the glass is at most $10^8$ poises, rapidly transferring the article from the mould before the surface viscosity exceeds $10^{10.5}$ poises and passing it to a cooling medium where the heat transfer is regulated to cool the article to a temperature such that its surface viscosity is at least $10^{12.5}$ poises. The moulding apparatus may open and drop the moulded article into the cooling medium or a gas jet may be provided to blow the article off a support in the open mould into the cooling medium.

18 Claims, 15 Drawing Figures

METHOD OF MOULDING AND TEMPERING GLASS ARTICLES

This is a continuation of application Ser. No. 406,851, filed Oct. 16, 1973, now abandoned.

BACKGROUND OF THE INVENTION

This invention relates to the moulding of glass articles, and is concerned in particular with processes and apparatus for moulding glass articles by press moulding.

In known press moulding apparatus in current use for moulding for example glass ophthalmic lens blanks, it is common to use a press table rotating about a vertical axis and carrying a number, say six or eight, bottom mould parts spaced around its circumference for presentation in succession at a moulding station by rotary indexing movement of the table. Prior to the moulding station, a gob of molten glass is run into each bottom mould part, shortly before a top mould part is brought down at the moulding station to engage the bottom mould part and press the gob into shape.

Following pressing of an individual gob into the shape, the bottom mould part in which the moulded blank lies, is rotated on at intervals by successive indexing movements of the table, through a number of index positions in which the moulded blank is simply lying in the bottom mould part and cooling towards a temperature at which, at a pick-off station, the blank can be removed safely from the mould by a pick-off device, for example a suction head, and transferred to an annealing lehr. For example the average viscosity of the glass before moulding may be about $5 \times 10^3$ poises corresponding to a glass temperature of 1050°C in the case of a typical ophthalmic spectacle glass and before the blanks can be picked-off in the known apparatus the glass must cool to increase the viscosity to about $10^{10.5}$ poises, i.e. a temperature about 600°C. For a given maximum indexing speed of the table, there is a maximum blank weight determined by these thermal requirements. Any blank with a weight exceeding this maximum cannot be processed unless the indexing speed is reduced below the maximum, with a consequent limitation on output. This can only be overcome by increasing the number of moulds employed with a consequent increase in capital and operating costs.

Other problems arise in connection with the control of mould temperature. To avoid sticking, it is desirable to control the temperature of the bottom plungers in the lower mould parts to stop their temperature rising too high. To avoid edge cracks the temperature of the bottom mould walls must be kept up. Apart from the inherent difficulties of providing control of these temperatures on a number of bottom mould parts on a continuously rotating table, further difficulties arise in that the mould temperatures must be allowed to vary as the table rotates to permit the blanks to cool, so that there are no set temperatures towards which the temperature of the different parts of the mould can be controlled.

Other operating disadvantages of the known apparatus are the initial cost and the replacement cost of the several lower mould parts, the production loss during the warming-up time required on starting-up before stable operating conditions are achieved, and the production loss or "down-time" incurred when replacing worn moulds or changing from one form of a moulded product to another, for example difficulty shaped ophthalmic lens blanks as every one of several lower mould parts has to be replaced or adjusted.

It is a main object of the present invention to provide an improved method and apparatus for the manufacture of moulded glass articles, in particular moulded lens blanks, which overcome the above mentioned disadvantages.

SUMMARY OF THE INVENTION

According to the invention a method of moulding a glass article comprises supplying a gob of molten glass to a mould, regulating the temperature of the mould and the time of closure of the mould to ensure that the viscosity of the glass of the surface of the moulded article when moulding is complete is at most $10^{10.5}$ poises and the viscosity of the glass at the centre of the thickness of the article is at most $10^8$ poises, rapidly transferring the moulded article from the mould while the surface viscosity is at most $10^{10.5}$ poises and passing it to a cooling medium, and regulating the heat transfer to the cooling medium from the moulded article to cool the article rapidly to a temperature at which its surface viscosity is at least $10^{12.5}$ poises.

A preferred method of operating the invention comprises supplying a gob of molten glass to a mould, closing the mould, regulating the temperature of the mould and the time of closure of the mould to ensure that the viscosity of the glass of the surface of the moulded article when the moulding is complete is at most $10^{10.5}$ poises and the viscosity of the glass at the centre of the thickness of the article is at most $10^8$ poises, opening the mould leaving the moulded article supported therein, rapidly transferring the moulded article from the mould while the surface viscosity is at most $10^{10.5}$ poises and passing it to a cooling medium, and regulating the heat transfer to the cooling medium from the moulded article to cool the article rapidly to a temperature at which its surface viscosity is at least $10^{12.5}$ poises.

Commonly the temperature at the centre of the article when moulding is complete is such that the viscosity at the centre of the article is at most $10^7$ poises.

If the transfer from the mould avoids handling forces which might distort the article, the method preferably comprises regulating the mould temperature and the time of closure of the mould to ensure that the surface viscosity of the moulded article is at most $10^8$ poises and the centre viscosity is at most $10^5$ poises, before transferring the article to the cooling medium.

The moulded article is usually supported from below when the mould is opened, by the support surface of the mould which has just formed the under surface of the article, which support surface provides support over the whole of the underface of the article.

The invention may comprise ejecting the moulded article from the open mould, and permitting the ejected article to fall freely into a body of cooling liquid constituting said cooling medium.

The dropping of the article from the lower mould part into the cooling liquid under free fall conditions avoids the application of any handling forces to the article which might tend to cause deformation of the article which can be ejected into the cooling liquid while the glass is at a relatively low viscosity.

When vertically press moulding an article the method may comprise opening the mould leaving the whole under surface of the moulded article supported on a lower part of the mould, and rotating said lower mould part about a horizontal axis to tip the article from the lower mould part into the cooling liquid.

There may simultaneously be actuation of the mould or a part thereof to impart an initial downward movement to the article. Alternatively the support surface of the mould may be in two or more parts which are rapidly moved apart to permit the article to fall.

In another way of operating, the article may be removed from the support surface of the mould by lifting the moulded article with a suction head which is presented to the article from above and which has an under surface conforming closely to the moulded shape of the upper surface of the article. The article is transferred by the suction head to a location over the cooling medium and is then dropped from the suction head under free fall conditions into the cooling medium.

In a particularly convenient and rapid alternative way of transferring the moulded article to a cooling medium, the article is blown from its support with a jet or jets of air or other gas so that it follows a free trajectory such that it eventually falls freely into the cooling medium. In this case the lower mould part preferably includes a part, for example a plunger, on which the moulded article is supported when the mould is opened following closure and which can be advanced upwards to a position in which the moulded article is exposed to said jet or jets and can be blown sideways from it. This method of rapid transfer requires that the moulded article is submitted to some force in order to project it into the required trajectory. In order that it shall not be harmed by this force it is essential that the viscosity of the surface of the article is at least $10^{5.6}$ poises i.e. is at a temperature of at most 850°C for a typical ophthalmic spectacle glass. In practice the viscosity will be at least $10^7$ and preferably at least $10^8$ poises when the blowing-off takes place. These viscosities correspond to temperatures of 750°C and 700°C respectively with a typical ophthalmic glass. This means that the blowing operation must be performed within a short period after opening the mould, whilst the glass surface is still relatively cool from contact with the mould and has not been re-heated by heat coming from the hotter glass within the body of the article. Naturally the time available will vary from one article to another but in general it will be of the order of 1 to 3 seconds. In practice it is readily possible to arrange that the blowing occurs within about half a second of opening the mould.

The cooling medium may be a liquid such as a mineral oil having a flash point above 300°C. Alternatively the cooling liquid may comprise molten inorganic salts, for example a mixture of sodium and potassium salts such as the chlorides or nitrates.

The method may also include the steps of sensing and controlling the temperature of the support surface of the lower mould part so that the temperature of that surface is low enough to avoid or minimise sticking of the hot moulded glass to the support surface of the mould. From this aspect the invention includes sensing the temperature of a part of the mould supporting the moulded article, and regulating cooling of that mould part under the control of the sensed temperature.

Further the temperature of the mould wall surrounding the periphery of the moulded article may be sensed and controlled so that it is high enough to prevent or minimise the occurance of peripheral edge cracks.

From this aspect the invention comprises sensing the temperature of the part of the mould constituting an upstanding mould wall defining the outer dimensions of the moulded article, and regulating heating of the mould wall under control of the sensed temperature.

Further the invention provides a method of moulding glass lens blanks comprising alternately feeding successive gobs of molten glass from a common supply to two alternating press moulding stations, moulding a lens blank at one station while feeding a gob to the other station, and ejecting each moulding lens blank, while the viscosity of the surface of the article is at most $10^{10.5}$ poises and the viscosity of the glass at the centre of the thickness of the lens is at most $10^8$ poises, into a bath of cooling liquid below the moulding stations to cool the lens blanks rapidly to a surface viscosity of at least $10^{12.5}$ poises.

According to another aspect of the present invention therefore there is provided apparatus for moulding a glass article including a mould, means for opening and closing the mould, a container for a body of cooling medium located to one side thereof and means for directing a jet or jets of air or gas at the mould, the arrangement being such as to permit the ejection of a moulded article from the mould by the jet or jets into a free trajectory leading to the cooling medium in the container.

The apparatus will usually be arranged to perform vertical press moulding and will preferably include a mould bottom having a part, for example a plunger, on which the article is supported after moulding and means for advancing the part upwards from its normal position to one in which the moulded article is presented in a position directly aligned with the jet or jets.

Generally the container will be located below and to one side of the mould so that the glass articles follow a trajectory which rises a few inches to begin with and then falls into the container. The container could however in some cases be on a level with or even slightly above the starting position of the articles on the mould.

The invention also includes apparatus for moulding a glass article including a mould, means for opening and closing the mould, a tank containing a body of cooling medium located below the mould, and means for actuating the mould when open to eject a moulded article into the cooling medium.

In one form of apparatus according to the invention for vertically press moulding a glass article, the mould comprises a mould bottom, a co-operating plunger vertically aligned with the mould bottom, and a mounting for the mould bottom rotatable about a horizontal axis, to tip a moulded article into the cooling medium.

The mould bottom may in this case be supported in a table in a moulding position, means being provided for rapidly rotating the table to permit the moulded article to fall out of the mould part into the cooling medium under free fall conditions. That is the article is rapidly transferred from the mould under conditions such that no deforming forces are applied to the article during the removal.

In one embodiment of the invention the mould bottom includes a mould body and a lower plunger extending upwardly into a shaped aperture in the mould body, the upper surface of the plunger defining the shaped floor of the mould, and the lower plunger is connected to actuating means operable to advance the lower plunger by a predetermined distance into said aperture as the mould bottom is being tilted about said horizontal axis to assist ejection of the moulded article from the mould bottom.

The lower plunger is in this case preferably formed with a cooling channel, and temperature sensing means in thermal contact with the plunger is connected to means controlling the flow of cooling fluid through that channel.

Still further the apparatus may include heating means associated with the mould body and temperature sensing means in thermal contact with the mould body and connected to control means for said heating means.

In one apparatus according to the invention, for moulding ophthalmic lens blanks, two moulds are mounted side-by-side for alternate operation. This apparatus comprises two said moulds mounted side-by-side above the tank of cooling medium, glass feeding means which is pivotally mounted for location at gob-feeding positions associated with the moulds, drive means for pivoting the glass feeding means, actuating means for rotating each mould bottom about its horizontal axis, and control means connected to means actuating the mould plungers, to said drive means for the glass feeding means and to said actuating means for rotating the mould bottoms, to synchronise alternate operation of the moulds.

The apparatus according to the invention may also include a bottom mould which may be in two or more parts which are moved apart to permit the moulded article, when sufficiently cool, to fall under free fall conditions into the cooling medium.

The invention provides a process for moulding a succession of glass articles the moulding of each of which articles is carried out at a station comprising single top and bottom moulds which co-operate in moulding every article passing through the station and in which articles are moulded at a rate in excess of ten per minute.

The invention also comprehends a moulded glass article, in particular a moulded glass lens blank, produced by the method of the invention.

DESCRIPTION OF THE PREFERRED EMBODIMENTS

Figure 1:
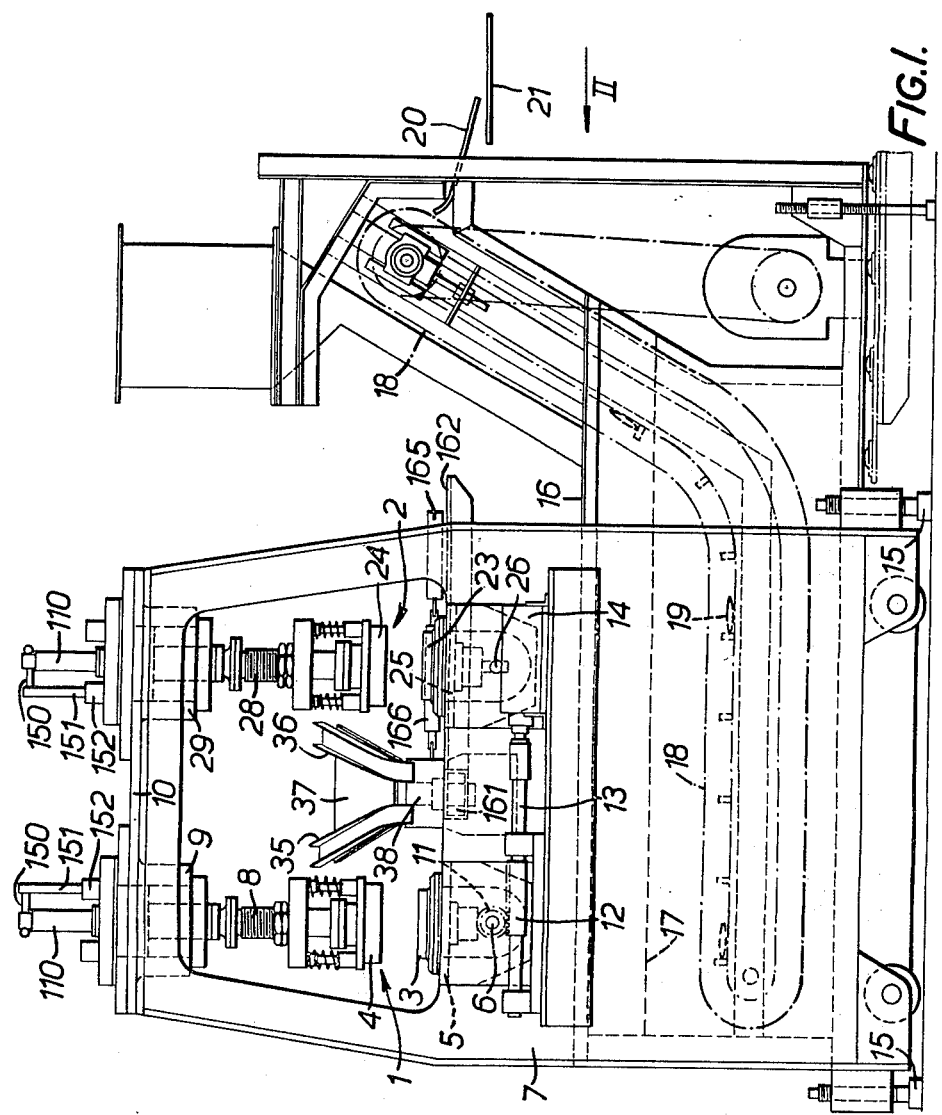
FIG. 1 is a side elevation of apparatus according to the invention for moulding ophthalmic glass lens blanks.
Figure 2:
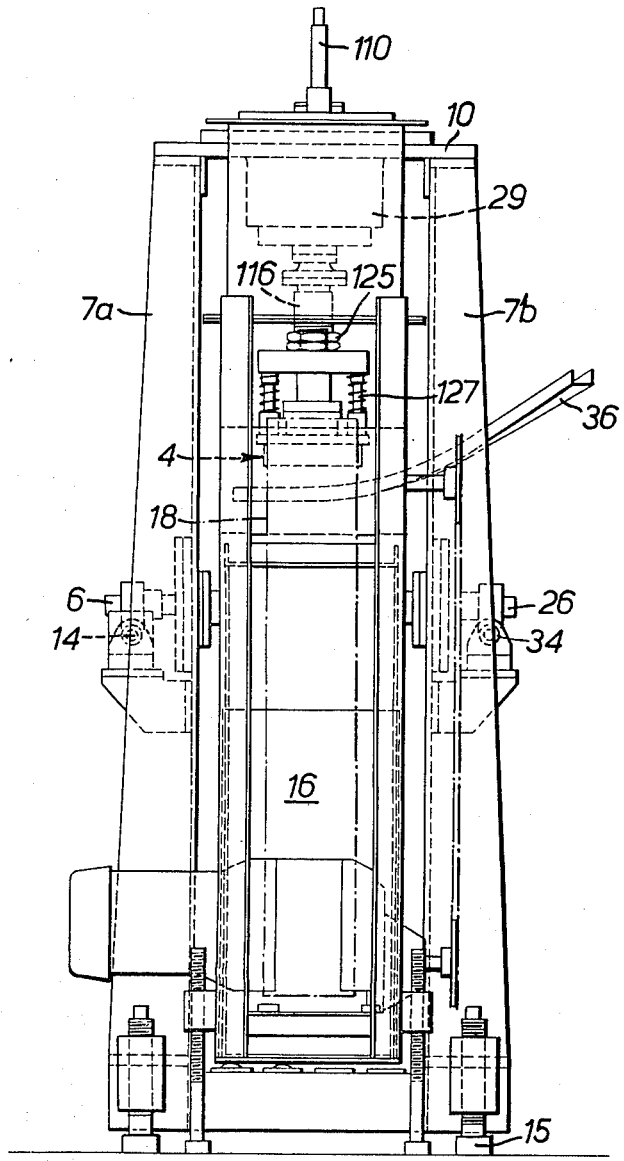
FIG. 2 is an end elevation of the apparatus of FIG. 1, in the direction of arrow II.
Figure 3:
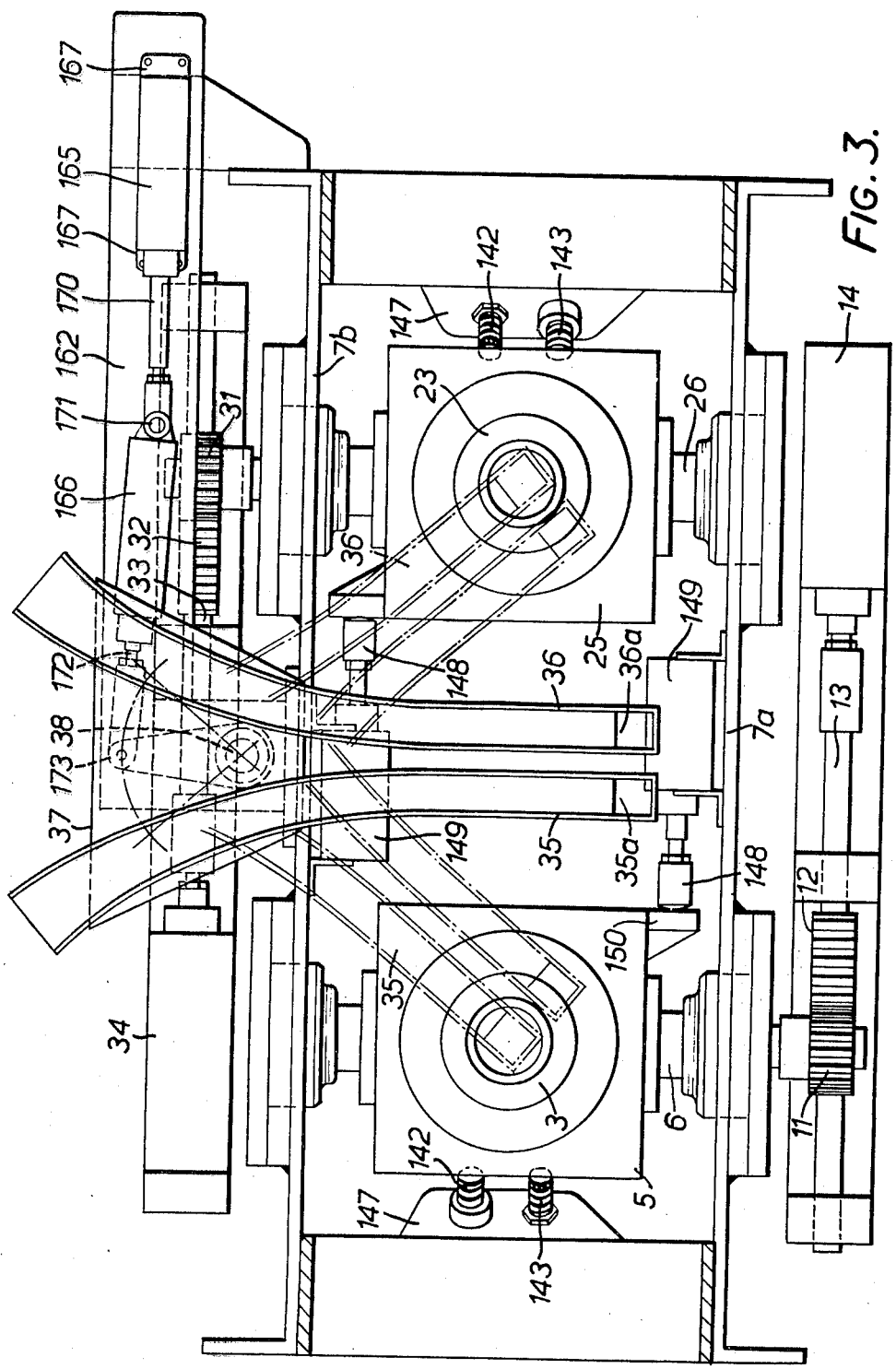
FIG. 3 is a plan view of the apparatus of FIGS. 1 and 2 showing two lower mould parts and their associated mounting and means for feeding gobs of molten glass to the lower mould parts.

Referring first to FIGS. 1 to 3, press moulding apparatus for moulding ophthalmic glass lens blanks includes two generally similar moulds 1 and 2 for moulding the ophthalmic glass lens blanks. The mould 1 includes a lower mould part 3 and an upper mould part 4 which are shown with the upper mould part 4 retracted from the moulding position relative to the lower mould part 3.

The lower mould part 3 is mounted on a press table 5 which is itself mounted on a horizontal axle 6 which is supported in bearings by a main frame 7 of the apparatus.

The upper mould part 4 is carried on the lower end of an operating shaft 8 of a conventional pneumatically operated press cylinder 9 mounted on an upper cross member 10 fixed to the main frame 7.

One end of the axle 6 carries a pinion wheel 11 which engages a rack 12 provided on the output shaft 13 of a conventional pneumatic operator 14. Horizontal movement of the shaft 13 when driven by operator 14 causes rotation of the pinion wheel 11 and is controlled in operation to rotate the table 5 between the pressing position shown in FIG. 1 in which the lower mould part 3 is open upwardly, and the eject position in which the table 5 and the lower mould part 3 have been rotated through 180° anti-clockwise on the axle 6, so that the lower mould part 3 is inverted.

Figure 12:
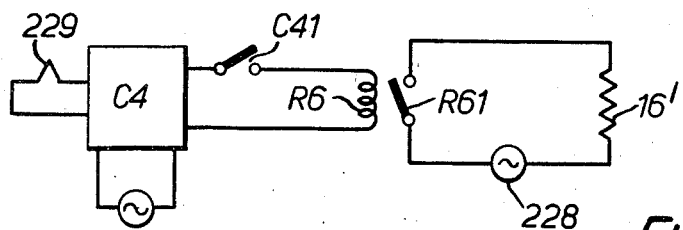
FIG. 12 illustrates control of a heater for heating an oil bath in which the moulded articles are cooled.

The main frame 7 is mounted on adjustable screw threaded feet 15 and also supports a tank 16 containing a body of heated oil whose surface level is indicated 17, which is maintained at a selected temperature in operation by conventional electric heating elements 16', FIG. 12, mounted in the tank 16. The oil is a mineral oil whose flash point is above 300°C and the oil temperature may be in the range 15°C to 270°C typically about 200° 220°C. A suitable oil is CYLREX FM (Mobil Oil Company). The tank 16 extends beneath both moulds 1 and 2 and there is mounted in the tank a chain driven wire mesh conveyor 18 which extends along the bottom of the tank 16 and is driven in operation so that its upper surface moves in the direction from the mould 1 to the mould 2. At the end of the tank 16 remote from the mould 2 the conveyor 18 travels upwardly to project upwardly out of the oil 17 and out over the end of the tank 16 so that lens blanks lifted out of the tank by conveyor can be deposited on a chute 20 leading to a further conveyor 21 indicated only diagrammatically in FIG. 1. The conveyor 21 may for example be the conveyor of a conventional annealing lehr, and the lens blanks are cleaned after they leave the lehr.

The mould 2 and its associated apparatus are similar to the mould 1, including a lower mould part 23, an upper mould part 24, and a press table 25 mounted on a horizontal axle 26. The upper mould part 24 is carried on a shaft 28 of a pneumatic press cylinder 29. The axle 26 carries a pinion 31 which is driven by a rack 32 provided on the output shaft 33 of a second pneumatic operator 34.

To charge the moulds 1 and 2 with gobs of molten glass, inclined metal chutes 35 and 36 are provided. Chutes 35 and 36 are mounted on a metal plate 37 for rotation about a vertical axis 38 between three positions:

a. a central position, shown in FIGS. 1 and 3, in which the two chutes 35 and 36 are symmetrically positioned between the tables 5 and 25;

b. a position, shown in chain-dotted lines in FIG. 3, in which chute 35 is in position to deliver glass gobs to the lower mould part 3;

c. a position, also shown in chain-dotted lines in FIG. 3, in which the chute 36 is in position to deliver glass gobs to the lower mould part 23.

To this end, the floor of each chute 35 or 36 is formed with an opening, respectively 35a and 36a at its lower end to enable a gob of glass fed into the upper end to run down and drop into the bottom mould 3 or 23. Both chutes 35 and 36 are fed from a single inclined supply chute 40, FIG. 4, the lower end of which is positioned to feed glass gobs to which ever of the chutes 35 or 36 is in position to deliver gobs to its associated lower mould part 3 or 23. The upper ends of chutes 35 and 36 are shaped so that on rotation of the plate 37, each comes into register with the lower end of the chute 40, conventional pneumatic operators being provided to position the plate 37. Chute 40 is fed in conventional manner with gobs of molten glass 41 separated by shears 42 from molten glass 43 flowing downwards from an orifice tube 44 extending downwardly from the underside of a forehearth 44a of a glass melting tank, the upper end of the chute 40 being positioned to receive the gobs 41 separated by the shears 41.

Figure 4:
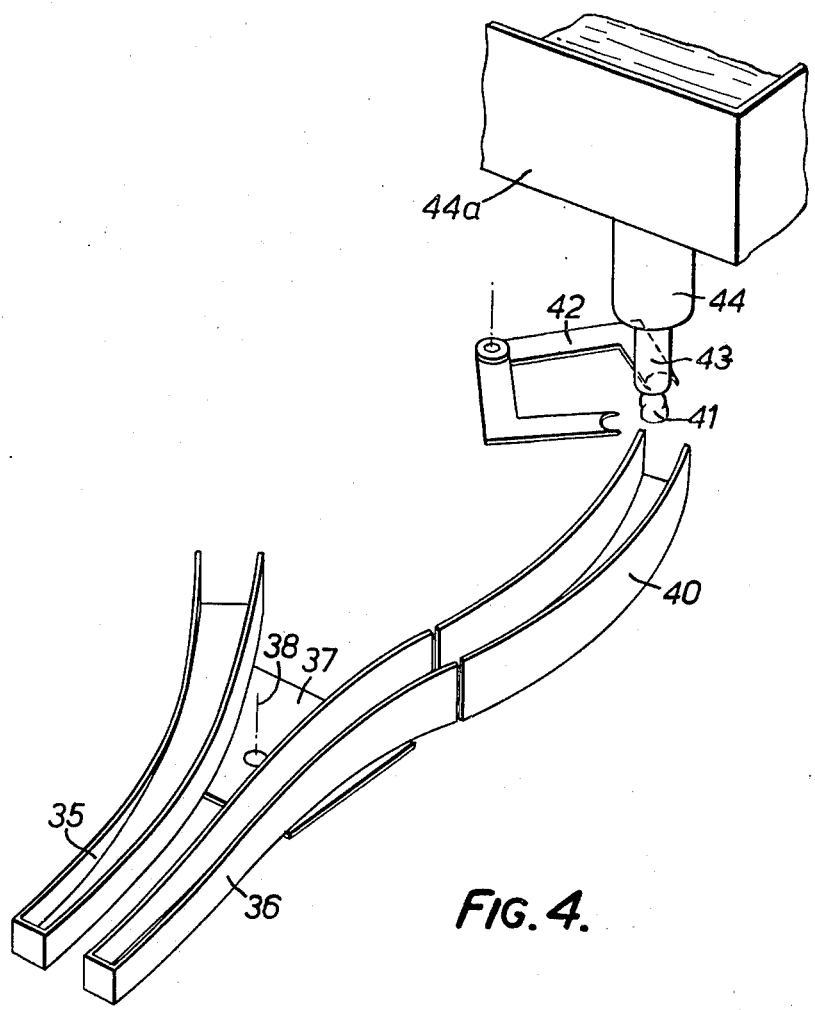
FIG. 4 illustrates part of a glass melting furnace and an outlet with shears for feeding gobs of molten glass to the apparatus of FIGS. 1 and 2.

The chute 40, shears 42, forehearth 44a and glass melting tank are conventional items indicated only diagrammatically in FIG. 4. The shears 42 are pneumatically operated in conventional manner under the control of a free running electronic timer T1, see FIG. 7, which actuates a pneumatic operator 212, FIG. 9, at a preset rate to cause the shears 42 to separate a gob of glass at selected intervals, for example once every 1.5 to 3.25 seconds.

The moulds 1 and 2 are operated alternately under the control of an electronically operated timing controller which includes the timer T1 for the shears operator 212, and which controls the operation of the press cylinders 9 and 29, the pneumatic operators 14 and 34 and the positioning of the chutes 35 and 36 relative to the operation of the shears 42. The molten glass gobs separated at regular intervals from the glass flowing through the orifice tube 44 run down the chute 40, and the chutes 35 and 36 are positioned in turn to feed the gobs alternately to the lower mould parts 3 and 23.

When a gob is to be fed to the lower mould part 3, the chute 35 will be in its gob-feeding position and the upper mould part 4 is retracted. Following delivery of the gob, the upper mould part 4 is brought down to its pressing position, held there for a short time, say 0.8 to 0.9 seconds, and then retracted. The operator 14 is then immediately actuated to invert the press table 5 and the lower mould part 3, ejecting the lens blank just moulded into the oil in the tank. Meanwhile the operator 34 has returned the other press table 25 to its pressing position, the next gob is delivered into the lower mould part 23 via the chutes 40 and 36, a lens blank is pressed by descent of the upper mould part 24, which is retracted and the table 25 is then inverted to eject the lens blank just formed.

The lens blanks which are thus moulded alternately by the two moulds 1 and 2, fall from them on inverting the table 5 or 25 respectively, under free fall conditions into the oil 17. The ejection from the lower mould part 3 or 23 occurs as rapidly as possible, for example 1 second after withdrawal of the upper mould part 4 or 24, and while the glass surface is still at a temperature, at which its viscosity may be $10^8$ poises or less but may in some cases be as high as $10^{10.5}$ poises, although in the latter case the center temperature would be about 100° to 150°C hotter than the surface temperature so that the blank could not be picked out of the bottom mould 3 or 23 in conventional manner without risk or damage or loss of shape, as the glass is so soft.

By briefly supporting the lens blanks 19 in the lower bottom mould parts 3 and 23 which fully support the under surfaces of the blanks 19, and then ejecting them to fall freely into the oil 17, the blanks 19 are not submitted to any forces likely to cause loss of shape. On immersion in the oil the surface temperature of each blank falls rapidly, for example by 200°C in the first few milli-seconds effectively "freezing" the outer shell of each blank as it sinks through the oil, thus precluding any possibility of deformation. The blanks 19 then fall on to the upper surface of the conveyor 18 and are removed from the oil 17 in a time determined by the speed of the drive of the conveyor 18.

The quenching which the lens blanks 19 undergo on immersion in the oil toughens the blanks 19 by creating conditions in which surface compressive and central tensile stresses are set up. Whether these stresses are retained or not will depend on the subsequent heat treatment of the blanks 19. Thus, for example, if the conveyor 21 leads into a conventional annealing lehr for lens blanks, the stresses will be relieved and the blanks 19 obtained will be untoughened. On the other hand, if toughened lens blanks are required, the quenching conditons i.e. the nature of the oil and its temperature and, within limits, the glass temperature on entering the oil are all factors which contribute to determining the stresses induced in the lens blanks, as does the subsequent heat treatment of the blanks for example the temperature of the oil and the time for which the blanks remain in it.

In presently known apparatus, the lens blanks are left in position on the bottom mould until their surfaces have cooled so that their viscosity is above about $10^{10.5}$ poises so that they can be safely picked off the mould and transferred to a lehr conveyor for annealing. This requires that the blanks remain on the mould for a period of approximately 10 seconds or more depending on their size and the cooling rate achieved. As a result, the apparatus is wholly designed in rotary form with say six, eight or more bottom moulds mounted around the periphery of a circular pressing table, the table being indexed so that each bottom mould progresses in turn first from a gob receiving position to a pressing position, then from the pressing position through successive cooling positions and finally to an unloading position in which the blanks are sufficiently cool to be picked off and transferred to a lehr conveyor. The need to cool the blanks sufficiently imposes limits on the rate at which glass can be processed by the apparatus. For example with an existing eight position rotary table, the maximum rate of operation expressed as the number of shear cuts (i.e. the number of gobs pressed) per minute is found to vary as follows with the weight of each gob:

TABLE I

| Gob Weight | Cuts/Minute | Glass Output (Kgs/hr) |
|---|---|---|
| 50 gms | 15 | 45 |
| 30 gms | 25 | 45 |
| 25 gms | 30 | 45 |
| 20 gms | 30 | 36 |

The rate of 30 cuts a minute is the maximum operating speed used in practice and as the gob weight increases above 25 gms, the rate has to be progressively slowed to permit time for the pressed blanks to cool while on the table. The result is that the rate of processing glass is roughly constant at about 750 gms/min for gob weights above 25 gms.

Dealing with an apparatus similar to that described with reference to FIG. 1 but having only two bottom moulds and two plungers, the corresponding figures are as follows:

TABLE II

| Gob Weight | Cuts/Minute | Glass Output (Kgs/hr) |
|---|---|---|
| 50 gms | 26 | 78 |
| 30 gms | 28 | 50.4 |
| 25 gms | 30 | 45 |
| 20 gms | 30 | 36 |

In comparison with Table I, the rates for gob weights above 25 gms are higher, whilst a proportionate increase will be obtained if the number of moulds is increased.

Further problems arise is known apparatus in connection with control, particularly temperature control. Firstly, if as is usual the apparatus is of the kind including a rotary press table which rotates continuously in operation, unless all the control apparatus is mounted on and rotating with the table with consequent increases in size and weight of the table, there will be all the problems associated with coupling static control equipment with the items on a rotary table. Two or three such controls are desirable. Firstly, unless the mould body surrounding the bottom mould plunger is maintained at a sufficiently high temperature, a proportion of the lens blanks will be defective owing to the presence of edge checks or cracks. Secondly, unless the plunger of the bottom mould is cooled its temperature may rise excessively, causing the lens blanks to stick. Controlled cooling of the top mould plunger is also advisable for similar reasons.

Further difficulties are encountered in effecting control of these temperature on a rotary table in that the temperature of each bottom mould varies from one station on the table to another, as the moulds have to be allowed to cool after the blanks are pressed. In apparatus according to the present invention, no cooling of the moulds 3 and 23 is needed and their temperatures can therefore be controlled towards a selected temperature which remains constant throughout the operation.

As will be described in detail with reference to FIG. 3, the required controls are effected firstly by mounting a thermocouple in each bottom mould body, the voltage derived from which is fed to a temperature controller the output of which controls the operation of one or more gas flame heaters playing on the outer edge of the mould body. Secondly, the interior of each bottom mould plunger is hollow and cooled by an air flow which is controlled by a temperature controller coupled to a thermocouple mounted in the body of the plunger. Each top mould plunger may have its temperature controlled similarly.

It will be apparent that, apart from the economy resulting from the smaller number of expensive mould tools i.e. the need for each product to be produced of only one or two top and bottom moulds as compared with one top mould and from six to twelve bottom moulds, other operating advantages flow from the use of apparatus according to the present invention. The tools have to be replaced from time to time, either when worn or defective or when changing the moulds to change the shape of the article, for example from one form of ophthalmic or optical lens blank to another. With a smaller number of tools the work involved is less, a complete change taking for example 10 minutes with a two mould machine according to the invention as compared with 40 minutes with a conventional eight mould machine. Equally on starting up operation, the moulds have to warm up and a period elapses before the apparatus is operating consistently to produce articles within the dimensional limits specified. With apparatus according to the invention and employing the temperature controls described, the mould parts are operating at a constant controlled temperature which assists in producing stable conditions more rapidly and, for example with a two mould apparatus according to the invention, operation to produce acceptable ophthalmic lens blanks starting from cold was achieved within about 10 minutes whereas a conventional eight mould table requires about 50 minutes to achieve operation within specification.

Figure 5:
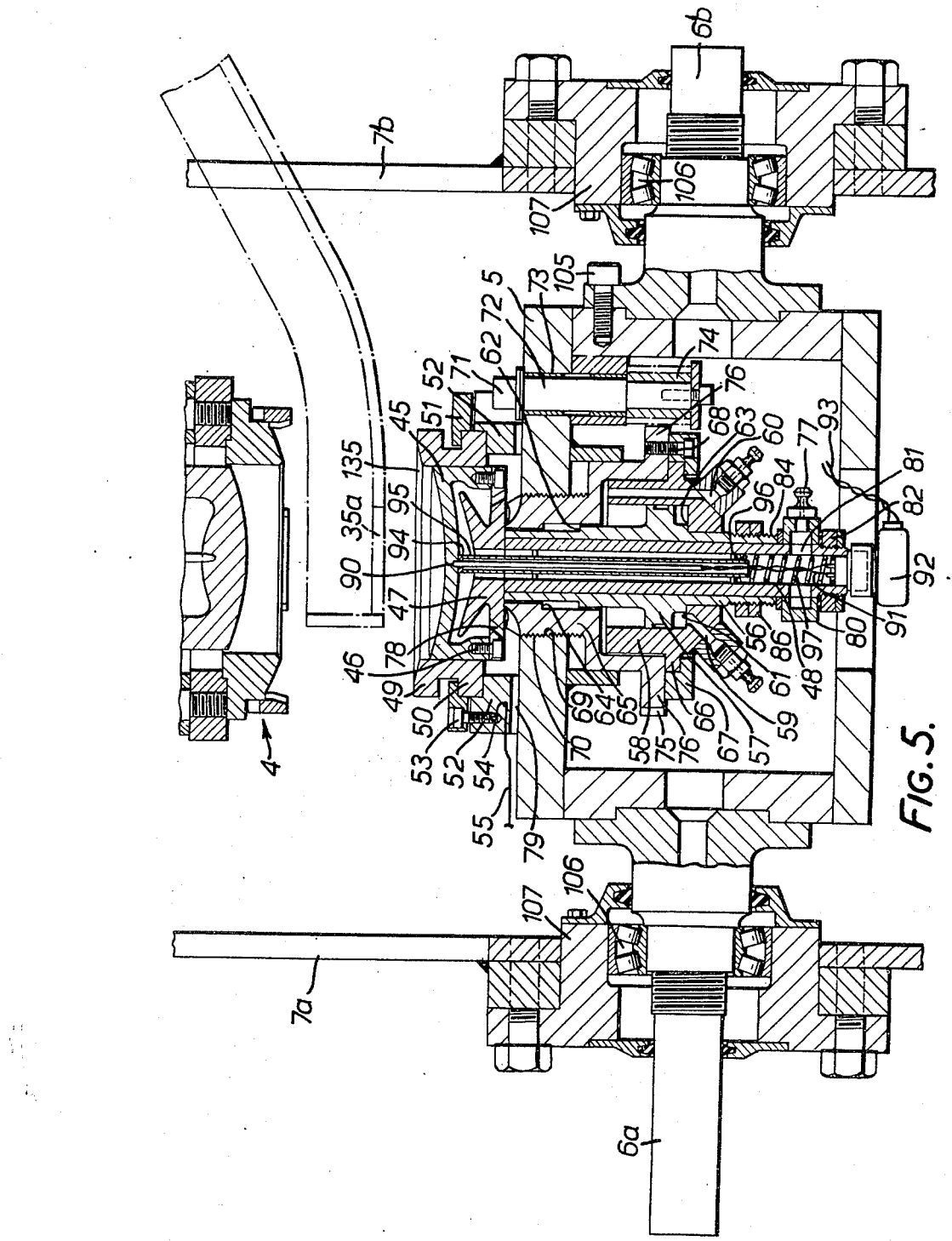
FIG. 5 is a vertical section through one of the lower mould parts of FIGS. 1 to 4, also indicating the withdrawn position of its co-operating upper mould part.
Figure 6:
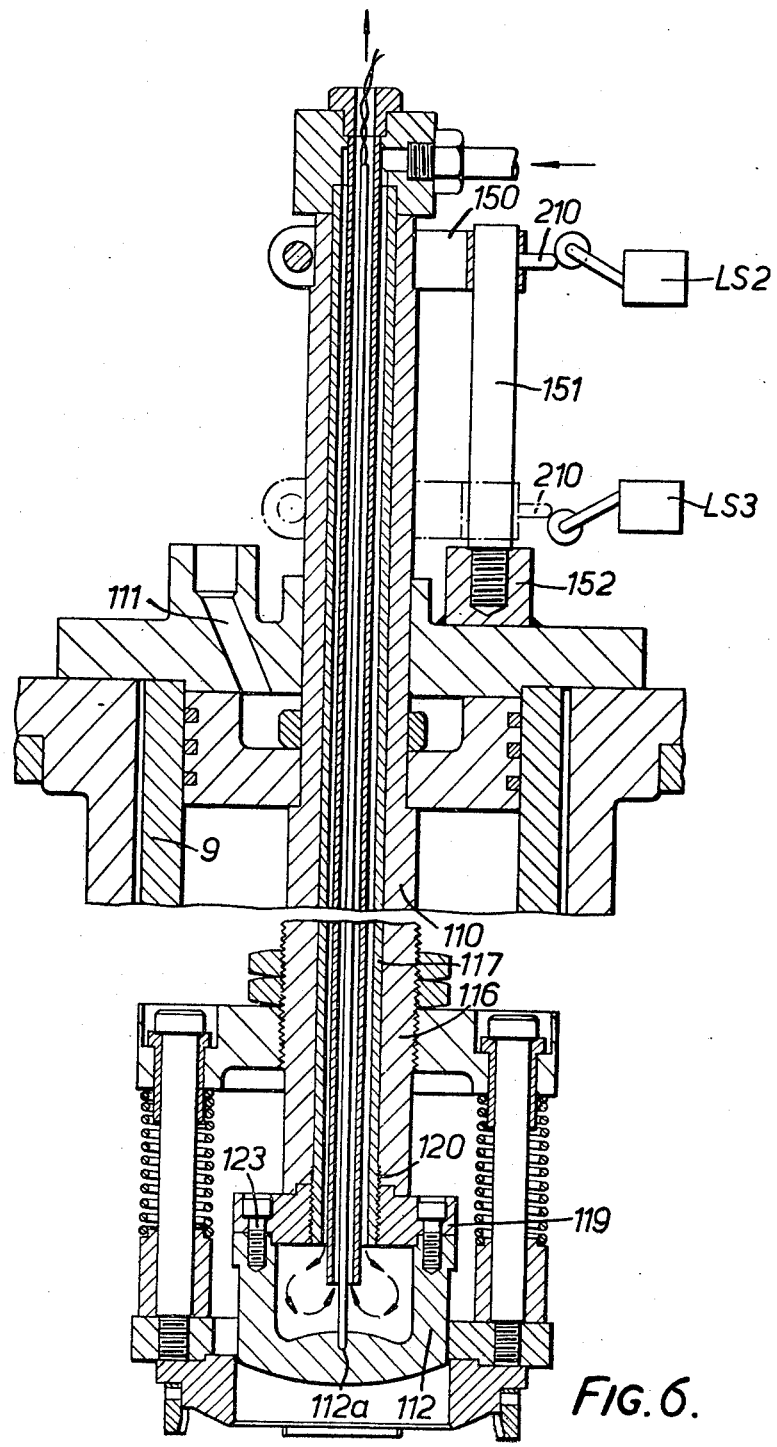
FIG. 6 is a vertical section through the upper mould part co-operating with the lower mould part illustrated in FIG. 5.

FIGS. 5 and 6 together show the detailed construction of the mould 1 including the rotatable table 5 supporting the lower mould part 3.

The lower mould part 3, as shown in FIG. 5, includes a plunger 45 secured by bolts 46 of which only two are shown in FIG. 3, to a backing plate 47 carried on the upper end of a vertical hollow stem 48 which is supported for limited axial movement relative to the press table 5 to which the mould body 49 of the lower mould part is clamped. A lower annular flange 50 on the body 49 is held between clamp 51 and an annular metal ring 52 which is secured to the upper surface of the table 5. The clamps 51 are secured by bolts 53, only one of which is shown, to the ring 52. One junction of a thermocouple 54 is mounted within the mould body 49 for sensing the temperature thereof and has a lead 55 for connection to a controller C1, FIG. 10, including the other junction of the thermocouple.

The stem 48 carries a sleeve 56 which is formed with an annular flange constituting a piston 57 lying within a cylinder 58. Compressed air can be supplied to and exhausted from the cylinder 58 through ports 59 and 60 leading respectively to the lower and upper ends of the space within the cylinder 58, thus providing a doubleacting piston and cylinder arrangement, enabling the stem 48 to be driven axially within the limits of movement permitted by engagement of shoulders 61 and 62 on the sleeve 56 respectively with the lower end surface 63 of the cylinder 58 and a shoulder 64 on a support member 65 for the cylinder 58. The main body of the cylinder 58 has an annular external flange 66 which is clamped to the support member 65 by a split ring 67 which is secured to the member 65 by bolts 68, only one of which is shown appears in FIG. 3.

The support member 65 is itself adjustable in position axially, that is vertically as shown in FIG. 3, with respect to the press table 5, its upper end being formed with an external screw thread 69 which engages a complementary thread provided on the inner surface of the cylindrical bore 70 provided in the upper surface of the press table 5 to receive the member 65. Axial adjustment of the position of the support member 65 adjusts the position of the limits of travel of the plunger 45 relative to the table 5. This enables the mould to be used to press a variety of shapes and thickness of lens blanks.

To facilitate this adjustment a drive is provided from a knob 71 mounted above the upper surface of the table 5 on the end of a vertical shaft 72 carried in sleeve bearings 73. The lower end of the shaft 72 carries a pinion 74 secured to it by a bolt. The teeth on the pinion 74 engage gear teeth 75 provided on the periphery of an annular flange 76 provided on the lower end of the support member 65. Rotation of the knob 71 provides a drive through the shaft 72, the pinion 74 and the gear teeth 75 to rotate the member 65 about its vertical axis and thus, through engagement of the screw threads 69 and 70, to move the member 65 axially relative to the table 5.

The interior of the stem 48 is supplied with cooling air through a conduit attached to a nozzle 77, the air exhausting to atmosphere through ports 78 in the under surface of the backing plate 47 and further ports 79 in the ring 52. The nozzle 77 leads into the interior of a small annular drum 80 which surrounds the lower end of the stem 48 which is formed with ports 81. The drum 80 is supported in position against the lower end of the sleeve 56 by a nut 82, a suitable screw thread being provided on the exterior of the stem.

The lower end of the sleeve 56 also has a screw thread 84 on which a pair of nuts 86 are provided. The position of the nuts 86 is adjusted axially to provide a limit to the upward movement of the piston 57 and thus of the plunger 45, by abutting against the lower end of the body of the cylinder 58.

A pair of conventional gas burners, not shown, in FIG. 3, with flexible supply pipes are positioned where their flames can play on the mould body 49 to heat it. As will be described, the supply of fuel to these burners is controlled in conventional manner between high and low heating conditions under the control of an electronic temperature controller C1, FIG. 10, which is coupled to the thermocouple 54.

One junction of a thermocouple 90 is mounted in a cavity in the underside of the body of the plunger 45, leads 91 which are partly sheathed, passing back down the stem 48 to a plug and socket connector 92 at the lower end from which further flexible lead 93 is taken out to the exterior of the apparatus. To maintain the thermocouple junction 90 in good thermal contact with the plunger 45 a brass disc 94 is brazed to the outside of the sheath of the leads 91 in a position such that when it bears against the underside of the plunger 45, the tip of the junction 90 is in firm contact with the top of the cavity. The disc 94 is supported by a metal sleeve 95 which is coaxial with the leads 90 and carries a pair of spacers to position it within the sleeve 48. A helical spring 97 is compressed between the lower spacer 96 and the interior surface of the socket 92 at the lower end of the sleeve 48 so as to provide sufficient pressure to maintain the thermal contact required. As will be described with reference to FIG. 11, the thermocouple 90 is connected to an ON/OFF controller C2 which controls the supply of cooling air to the stem 48 through the conduit connected to the nozzle 77.

The axle 6, FIG. 5, carrying the press table 5 is in fact two half-shafts 6a and 6b secured by bolts 105 one of which appears in FIG. 5, to the opposite sides of the table 5. Each half shaft 6a and 6b is carried in a conventional roller bearing 106 supported and suitably sealed into a trunnion 107 mounted in the respective side wall 7a or 7b of the main frame 7. Half shaft 6a is rather longer than half shaft 6b and at its outer end carries the pinion 11 through which the linear drive from actuator 14 via shaft 13 and rack 12 is transmitted as a rotary drive to the table 5. The half-shafts 6a and 6b each have axial bores which enable the lead 93, flexible connections to the conduits 59, 60 and 77 and other similar connections to pass out to the exterior of the table 5.

The lower end of the chute 35 is shown in FIG. 5 in dotted outline in position to deliver a gob to the lower mould part through the opening 35a in its bottom surface.

The upper mould part 4 is shown in FIG. 5 withdrawn upwardly from the lower mould part 3, and is shown in greater detail in FIG. 6. The mould 4 is carried on a vertical hollow stem 110 which is the shaft of a conventional pneumatically operated double acting piston and cylinder constituting the press cylinder 9. This is entirely conventional and is not described in detail, except to say that it is secured to the cross member 10 of the main frame 7 and is connected by conduits one of which is shown at 111 to control apparatus for supplying and exhausting air from the top and bottom of the cylinder 9.

The inner shaft 117 is located at its lower end with respect to the outer one 116, by a ring 119 which is secured to the lower end of the shaft 117 by co-operating screw threads 120 and abuts against the lower end of the shaft 116. The ring 119 acts as a backing plate for a hollow upper mould plunger 122 which is secured to it by bolts 123. A thermocouple 112a is mounted in the plunger 122 in similar manner to the mounting of thermocouple 90 in the lower mould plunger 45. Leads 112b from the thermocouple 112a are connected to a further ON/OFF controller C3, FIG. 11, for controlling the supply of cooling air to the plunger 122.

The external surface of the shaft 116 has a screw thread 116a, onto which is screwed an upper spring plate 124, a pair of nuts 125 serving to lock its position along the shaft 116 and permitting adjustment of the final relative positions of the upper mould plunger 122 and the lower mould plunger 45 at the end of a moulding stroke. The plate 124 has recesses 126 in which sit the heads of long shanked bolts 127, the lower screw threaded ends of which are engaged in suitably screw threaded bores 128 in the lower spring plate 129. The upper ends of the shanks of the bolts 127 slide in flanged sleeves 130 which are fitted into the recesses 126 in the upper spring plate 124, whilst further sleeves 131 surround the lower ends of the shanks. The lower ends of sleeves 131 seat on the upper surface of the lower spring plate 129 whilst the upper ends provide annular seats for helical springs 127a which are compressed between the lower surface of the upper spring plate 124 and the seats on the sleeves 131.

The lower spring plate 129 carries a mould ring 132 which is secured to it by bolts 133, only two are shown dotted in FIG. 6. The mould ring 132 has an annular spherical under-surface 134 which when the top mould 4 is lowered into the pressing position engages a mating annular spherical surface 135 provided on the upper side of the bottom mould body 49, so as to locate the two moulds 3 and 4 relative to one another, thus determining at the end of each moulding stroke the final relative positions of the upper mould plunger 122 and the lower plunger 45. The ring 132 is provided with guides 132a which fit over the edges of mould body 49 as the top mould 4 advances to the moulding position and serve to locate the upper mould part 4 axially with respect to the lower mould part 3.

To the upper end of the stem 110 there is fixed a guide member 150 which slides on a vertical guide rod 151 which is supported in a block 152 welded to the top of the cylinder 9. The guide member 150 serves to prevent rotation of the stem 110 and also carries a finger 210 which co-operates with a pair of conventional limit switches LS2 and LS3 to actuate the switches when the stem 110 and hence the plunger 122 is at the top and bottom of its stroke. The limit switches provide signals that are utilised in the control circuits 201, FIG. 7.

The construction and operation of the mould 2 are identical to that of the mould 1.

For convenience, both press tables 5 and 25 are shown in FIGS. 1 to 3, in the position in which the lower mould parts 3 and 23 are in moulding position, although in operation they will not be in this position simultaneously.

The operating stroke of the operator 14 is determined to give longitudinal movement of the rack 12 sufficient to rotate the table 5 through 180° on the axle 6 from the "press" position to the "eject" position. Two conventional limit switches LS5 and LS6, FIG. 8, are provided to co-operate with the shaft 13 to be actuated when the shaft is at one extreme of its movement and the other when it is at the other extreme. These switches are utilised to provide signals to the control circuits 202, FIG. 7, indicating when the table 5 is in one or other of its two extreme positions, i.e. the moulding position or the eject position with the bottom mould 23 inverted. Two similar limit switches LS5' and LS6' co-operate with shaft 33 to provide similar signals indicating the disposition of the table 25. The signals are fed to control circuits 201, FIG. 7.

As each table is inverted, the appropriate cylinder 58 is operated to advance the bottom plunger 45 to eject the lens blank.

A further limit switch LS1, FIG. 8, is provided on the table 5 to provide a signal to the control apparatus as the table commences to rotate back from its inverted position. For this purpose on table 5, a cam 211, FIG. 8, is provided on shaft 6 which actuates the limit switch LS1 shortly after the table has left the inverted position. Similar provision is made on table 25.

FIG. 3 also shows dampers 142 and stops 143 which are provided to retard and locate the press tables 5 and 25. The dampers 142 are hydraulically loaded and have plungers which are engaged by flats on the tables 5 and 25 as the latter near the end of their travel to their moulding positions in which the lower mould parts 3 and 23 are open upwardly. The dampers 142 brake the movement of the tables 5 and 25 before further flats on the tables engage the stops 143. The dampers 142 and stops 143 are mounted in brackets 147 fixed to the main frame 7 of the apparatus.

To enable the tables 5 and 25 to be clamped firmly against the stops 143, locks 148 are provided. These are carried by the shafts of pneumatic operators 149 which are mounted on the sides 7a and 7b of the main frame and are controlled to advance each of the locks 148 against a flat 150 on its table 5 or 25 after that table has been rotated into position against the stops 143, thus clamping the table in moulding position.

FIG. 3 also shows some detail of the chutes 35 and 36 and the actuating mechanism positions them. The vertical axis 38 for the plate 37 is a pillar which is supported by a thrust bearing 161 which is carried on a shelf 162, itself supported on the side 7b of the main frame of the apparatus. The upper surface of the shelf 162 is machined flat and supports a pair of pneumatic operators 165 and 166. Operator 165 is fixed in position by brackets 167 but operator 166 is supported by feet having undersurfaces which are machined flat and slide on the upper surface of the shelf 162.

The output shaft 170 of the operator 165 is linked by a pivoted coupling 171 to the body of the operator 166 whose output shaft 172 of the operator 166 is linked by a similar pivoted coupling 173 to a link 174 carried by the pillar 38.

The link 174 has three operating positions which correspond to the three operating positions of the chutes 35 and 36. With neither operator 165 or 166 operated, the link 174 is in the right-hand one of the three positions with the chutes 35 and 36 rotated clockwise so that chute 35 is positioned over the bottom mould 3 on table 5. With operator 165 operated, the operator 166 undergoes both translation and rotation on the surface of the shelf 162, to bring the link 174 to its central position with the chutes 35 and 36 also centrally positioned between the tables 5 and 25. With both operators 165 and 166 operated, the link 174 rotates to its left-hand position which positions to the chute 36 over the bottom mould 23 on table 25. A cam, not shown, mounted on the lower end of the pillar 38, co-operates with a pair of limit switches LS4 and LS4', FIG. 8, to operate switch LS4 when the chute 35 is in position to deliver a gob to the mould 3, and to operate switch LS4' when the chute 36 is in position to deliver a gob to the mould 23.

Figure 7:
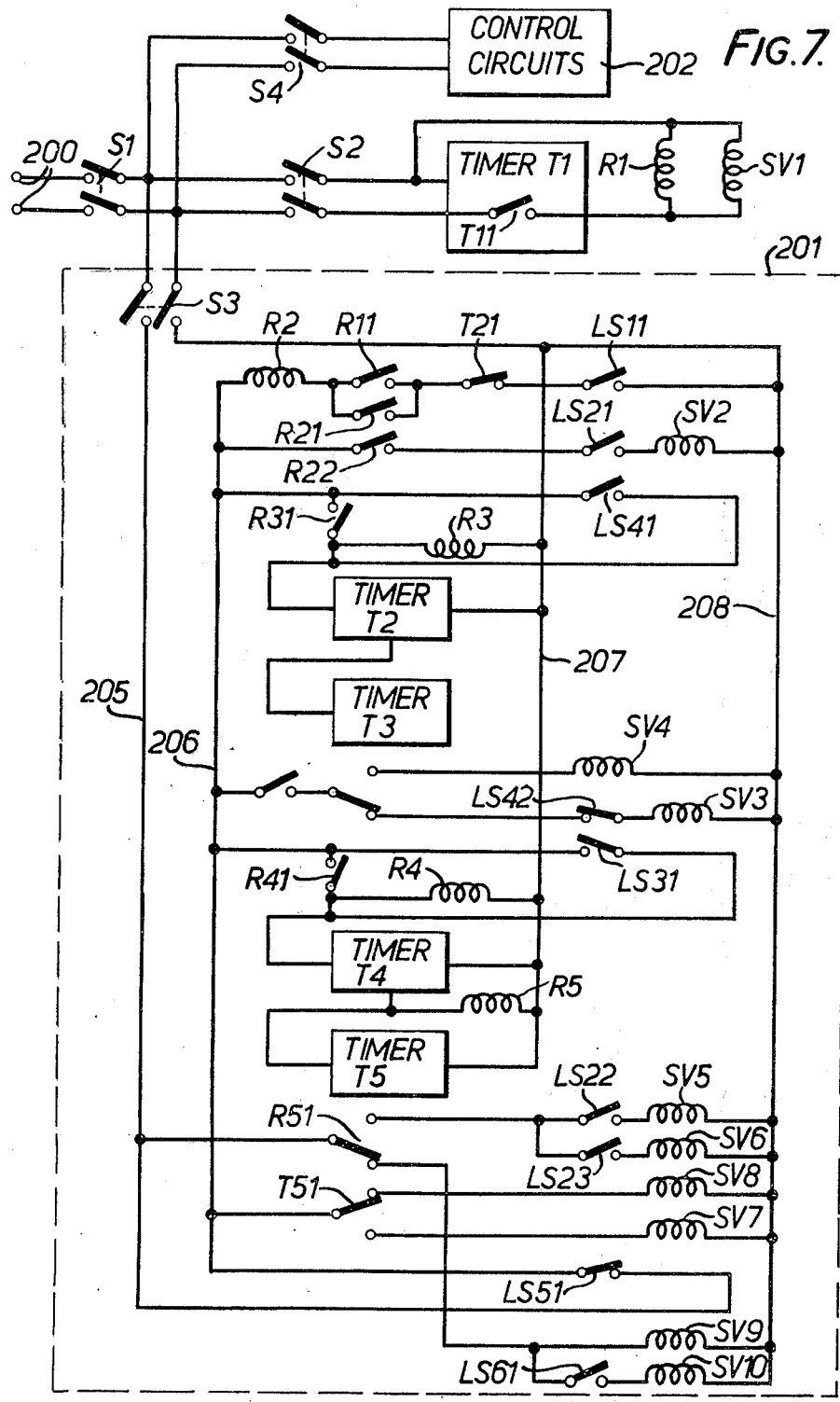
FIG. 7 is a circuit diagram of the electric control circuit which controls operation of the apparatus of FIGS. 1 to 6.
Figures 8, 9:
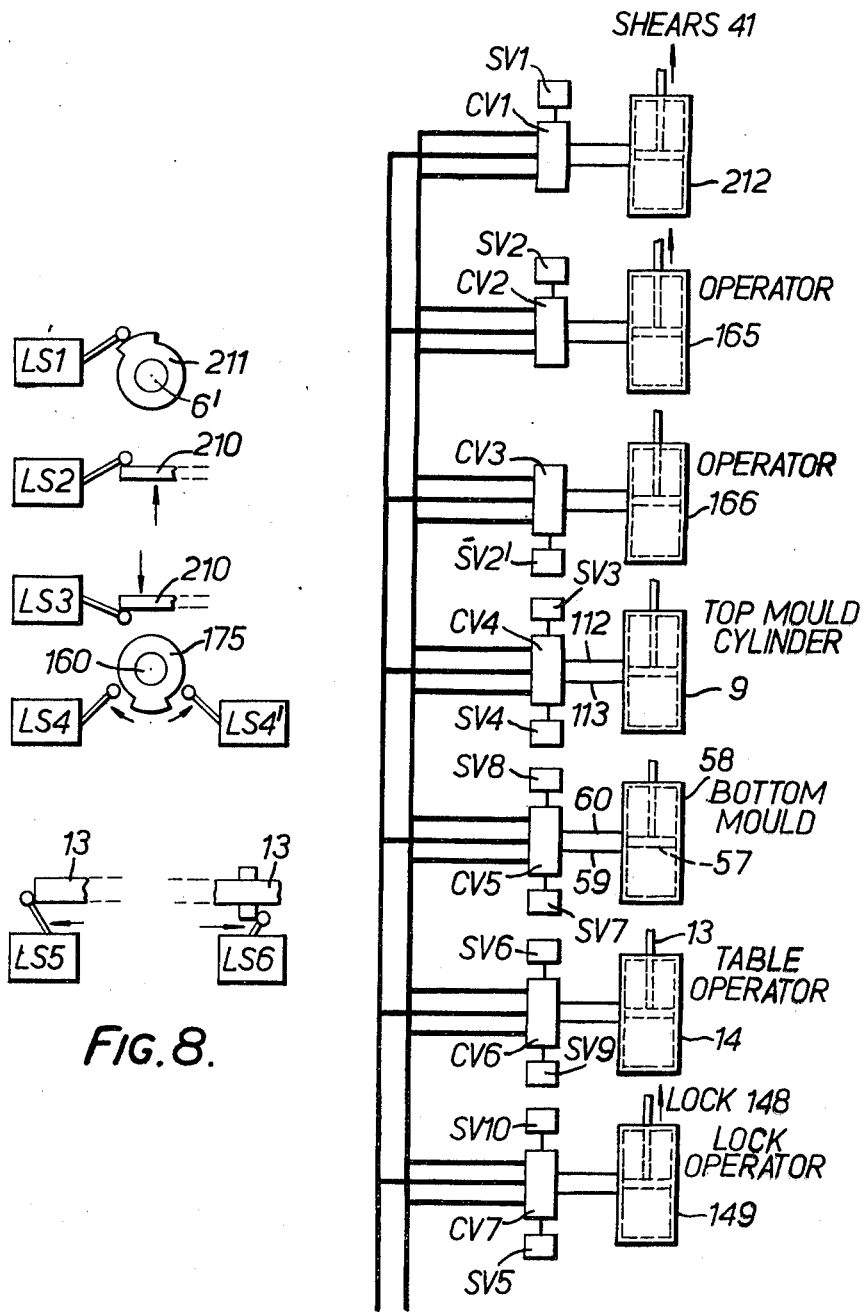
FIG. 8 is a schematic diagram illustrating the actuators for limit switches which form a part of the circuit of FIG. 7.
FIG. 9 is a pneumatic circuit diagram showing actuators for parts of the apparatus of FIGS. 1 to 6, and showing control valves which are operated by the circuit of FIG. 7.

FIG. 7 shows the electrical control circuit which controls the operation of the apparatus. The control apparatus is actuated by the limit switches on the apparatus which have already been described. There is a separate set of six limit switches provided in association with each of the moulds 1 and 2 and their associated apparatus.

1. The limit switch LS1 mounted adjacent to one end of the axle 6 for actuation by a cam on the axle 6 such that the switch is actuated as the table 5 commences to rotate from its fully inverted position back to the "press" position, and closes contact LS11 when it is actuated. A switch LS1' for mould 2 is similar.

2. The limit switches LS2 and LS3 which are respectively actuated by the finger 210 when the top mould plunger 4 is fully raised, and fully advanced to the pressing position. On actuation of switch LS2, normally open contacts LS21, LS22 and LS23 close, and on actuation of switch LS3 normally open contact LS31 closes. Switches LS2' and LS3' for mould 2 are similar.

3. The limit switch LS4 which is actuated by a cam 175 on the chute support pillar 38 when the chute 35 is in position to deliver a gob to the lower mould part 3, to close the normally open contact LS41 and open the normally closed contact LS42. Switch LS4' for mould 2 is similar except that it is actuated when chute 36 is in position to deliver a gob to mould 23.

4. The pair of limit switches LS5 and LS6 which are positioned beside the shaft 33 so that switch LS5 is actuated to open the normally closed contact LS51 when the table 5 is inverted and switch LS6 is actuated to close the normally open contact LS61 when the table is in the pressing position. Switches LS5' and LS6' for mould 2 are similar.

The operation of the pneumatic operator 212, FIG. 9, for the shears 41 is controlled by a solenoid valve SV1 of which the operating coil is shown in FIG. 7. This coil together with that of a relay R1 is connected across the output of the shears timer T1, which is a commercially available electronic timer which effectively operates as a switch T11 that is closed recurrently at intervals which can be set by an adjustment provided on the timer. Typically, for example, the timer T1 might be set to energise the valve SV1 to actuate the shears 41 once every 2¼ seconds. The timer T1 is supplied with electric power from a suitable 110V D.C. power source connected across terminals from which power is supplied to the whole apparatus through a main switch S1. Switch S2 separately controls the supply of power to the timer T1.

The timing control circuits 201 for the mould 1 are supplied with power through a further switch S3. A switch S4 controls the supply of power to the almost identical circuits 202 for the other mould 2. In the circuits 201, one side of the switch S3 is connected by a line 250 to the contact LS51 which is closed unless the table 5 is inverted. With contact LS51 made, as will be assumed to be the case, a connection is provided from line 205 to line 206 which supplies power to one side of all the individual circuits making up the timing circuits 201. The other sides of these individual circuits which are completed at different times, are connected to one or other of lines 207 and 208 which are connected to the opposite side of switch S3.

assuming the table 3 to be in the moulding position with the upper mould part 4 raised and the switches S1 and S3 closed, a circuit is completed from line 206 through contact R11, when relay R1 is energised as a shear cut is made, the normally closed contact T21 of a timer T2 to be described, and the contact LS11 which will be closed. This energises relay R2 closing normally open contact R21 to complete a self-holding circuit in parallel with contact R11, and also closing normally open contact R22 which completes a circuit through contact LS21 which is closed since the top mould 4 is raised, to energise the coil of a solenoid valve SV2. This operates to move the chutes so tht chute 35 is in position to deliver a gob. When this occurs limit switch LS4 is actuated to close contact LS41 completing a circuit from line 206 through LS41 and the coil of relay R3 to line 207 to energise relay R3, whilst simultaneously providing a circuit through the gob travel timer T2 to line 207 to energise timer T2. Energisation of relay R3 closes contact R31 to hold relay R3 energised and with it timer T2.

When timer T2 comes to the end of its preset time about, 0.9 to 1.0 secs., in the present example, it opens contact T21 breaking the circuits holding relay R2 energised and therefore releasing solenoid valve SV2 so that the chutes return to their central position. This opens contact LS41 but relay R3 and timer T2 remain energised through contact R31. At the same time timer T2 provides a circuit for energising the gob condition timer T3 which is preset to a time allowing the gobs to rest undisturbed on the mould 3 for a period, for example, 0.2 to 0.3 sec. in the present apparatus, before pressing is initiated.

Pressing is initiated when timer T3 comes to the end of its set period causing switch contact T31 to close. This completes a circuit from line 206 through contacts T31 and T41 to energise the solenoid valve SV3 which initiates downward movement of the upper mould part 4. When the upper mould part 4 reaches the bottom of its travel, switch contact LS31 closes, completing a circuit from line 206 through contact LS31 to energise relay R4 and the plunger dwell timer T4. Relay R4 closes contact R41 to provide a parallel circuit after contact LS31 opens and timer T4 operates after its preset time, about 0.6 sec. in this apparatus, to cause contact T41 to change over. This completes a circuit from line 206 through contacts T31 and T41 to energise solenoid valve SV4 which initiates raising of the plunger 112. At the same time timer T4 provides a circuit for energising relay R5, causing contact R51 to change over, and energising the mould eject timer T5.

Previously contact R51 had been maintaining a circuit from line 205 through contact LS61 to energise the solenoid valve SV10 for the table lock operator 149 and the solenoid valve SV9 controlling the table operator 14 to drive and hold the table to its "press" position. These circuits are now broken by contact R51.

As soon as the upper mould part plunger 112 is raised to the top of its travel contacts LS21, LS22 and LS23 which opened as soon as it started to descent, close again. Contact LS21 merely makes in the previously described circuit for the chute solenoid valve SV2, acting in that circuit as interlock to prevent the chute moving if the plunger is down. Contact LS22 completes a circuit from line 205 through contact R51 to energise solenoid valve SV6. Valve SV5 operates the table lock operator 149 to release the lock and valve SV6 operates the actuator 14 to rotate the table 5 rapidly to its inverted position.

While this is happening eject timer T5 operates changing contact T51 over to complete a circuit energising solenoid valve SV7, thus applying pressure to the under side of piston 57 to eject the blank as the table rotates to its inverted position. When the table reaches this position contact LS51 opens breaking the connection from line 205 to line 206 and thus de-energising all the circuits, except that through contact R51 which is connected directly to line 205. This releases all timers and relays still energised effectively resetting the circuits. Release of relay R5 thus occurring causes contact R51 to revert to the position shown in FIG. 7. The circuit then provided from line 205 energises solenoid valve SV9 which in turn causes the operator 14 to rotate the table 5 back to its moulding position, and when it reaches that position contact LS61 closes energising solenoid valve SV10 through contacts R51 and LS61 to operate the lock operator 149 to hold the table 5 in position.

Meanwhile, as soon as the table 5 starts to move back from its inverted position, contact LS51 closes again energising line 206 to enable a further cycle of operation to commence. At the same time contact LS11 closes so that, provided the timer T1 initiates a cut to give co-incidental closing of contact R11 and LS11 to energise relay R2, a new sequence is initiated.

The control circuits 202 for the other mould 2 are identical. They include a contact R12 of relay R1 connected in the corresponding place to contact R11 and operating in the same way.

At the commencement of operation, switches S1 and S2 are made to apply power to the timer T1 thus initiating operation of the shears 41. The initial gobs run down the chute 40 but, since the chutes 35 and 36 are in their central position, will be delivered into a catch pan provided for that purpose. Switch S3 is then made to energise the control circuits 201 for the mould 1 and these will commence a sequence of operations as described above. As soon as this is seen to commence, for example by swinging the chutes 35 and 36 round to deliver a gob to the mould 1, the switch S4 is made to apply power to the control circuits 202 for the mould 2, so that the mould 2 commences operation with the gob subsequent to that first delivered to mould 1. The rate of cutting of gobs as determined by the setting of timer T1 is approximately twice the rate of operation of the moulds 1 and 2. As a result, having set the moulds in operation on successive gobs, they will continue to operate alternately on the succession of gobs delivered to the chute 40.

The timer T2 is set by visually observing delivery of a gob to the mould and adjusting the timer so that the chute is swung away immediately after delivery; the gob condition timer T3 is set up to give the desired period during which the gobs rest on the moulds before pressing; the top plunger dwell T4 is set to give the desired period of engagement of the moulds; and the mould eject timer T5 is set to operate the piston 45 part way through the inversion of the table.

In addition, it will be noted that the sequence is organised so that as a gob is running from the shears down the chutes to a mould, the mould which will press it, is in the process of rotating back from its inverted position and in addition, the necessary movement of the chutes 35 and 36 is initiated after the shear cut has been made. This overlapping of operations enables the total cycle time to be reduced.

The time taken for a gob to run from the shears to a mould is longer than the time taken for the moulds to return from their inverted position. If the reverse were the case, the cams operating the limit switches LS1 and LS1' could be set so that the contacts LS11 and LS11' close at a predetermined time after the table has commenced to rotate, this time being determined in the light of the gob run time so that the gob arrives at the mould shortly after it is in position. No modification of the circuits 201 and 202 is required as the energising circuit for relay R2 operates in the same manner independently of the order of operation of contacts R11 and LS11.

FIG. 9 shows the interconnection of the pneumatic operators and the top and bottom mould cylinders with the solenoid valves. The operators and cylinders are all conventional double acting pistons and cylinders. The solenoid valves which control them, do so through conventional pilot operated five port valves of the kind having three inlet ports two of which we connected to an exhaust line E and one to a compressed air supply line A. The two outlet ports are connected directly to the operator or cylinder concerned and the valves each have two operative conditions in one of which one outlet is connected to the air line A and the other to the exhaust line E and in the other of which these connections are reversed. When provided with two pilot solenoid valves, energisation of the coil of one will cause the five port valve to take up one condition and hold it until energisation of the coil of the other causes it to change to the other. Alternatively one pilot valve may be provided energisation of which causes the five port valve to take up one condition but a spring bias is provided which returns the five port valve to the other condition as soon as the energisation ceases.

The solenoid valves SV1 to SV10 and SV2', have their operating coils connected in the control circuits of FIG. 7 to be energised in the sequence described with reference to FIG. 7. Valve SV1 controls the shears operator 212 through a spring biassed five port valve CV1 arranged so that the shears 41 close when the coil of valve SV2 is energised by time T1. Solenoid valves SV2 and SV2' respectively control the chute operators 165 and 166 through spring biassed control valves CV2 and CV3 respectively. Normally, the chutes are centred requiring operator 165 operated and operator 166 not operated. Control valve CV2 is therefore spring biassed to the position in which operator 165 is operated and solenoid valve SV2 when energised causes it to retract so that chute 35 rotates to the right over bottom mould 3, FIG. 3. Control valve CV3 is accordingly spring biassed to the position in which operator 166 is not operated with the result that energisation of solenoid valve SV2' when valve SV2 is not energised results in both operators 165 and 166 being operated and chute 35 rotates into position over bottom mould 23.

The upper mould part cylinder 9 is controlled by solenoid valves SV3 and SV4 through control valve CV4. Energisation of solenoid valve SV3 applies pressure to the top of the cylinder 9 to depress the plunger 122 while energisation of solenoid valve SV3 raises the plunger.

The bottom mould cylinder 53 is controlled by control valve CV5 and solenoid valves SV7 and SV8 so that energisation of solenoid valve SV7 causes plunger 45 to advance in the mould body causing ejection of the blank and energisation of solenoid valve SV8 causes it to retract again to its moulding position.

Solenoid valves SV6 and SV9 with control valve CV6 cause the table 5 to be inverted by operator 14 on energising solenoid valve SV6 and then driven back to the moulding position by energizing, solenoid valve SV9. Solenoid valves SV5 and SV10 with control valve CV7 cause the lock operator 149 to advance the lock 148 when solenoid valve SV10 is energised and to withdraw it when solenoid valve SV5 is energised.

Figure 10:
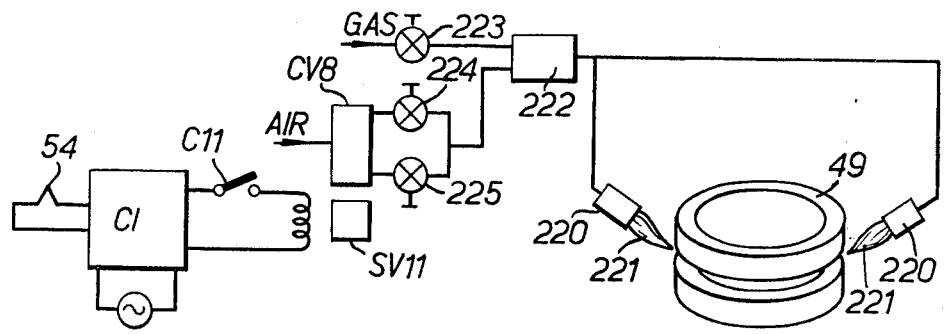
FIG. 10 illustrates the control of gas burners which heat the outer wall of a mould body of one of the lower mould parts.

FIG. 10 shows the temperature control arrangement for the lower mould body 49. Two gas burners 220 are provided and are mounted so that their flames 221 play on the outer surface of the body 49. The burners are supplied with a gas/air mixture from a mixer 222. This derives its gas from a suitable supply source through a control valve 223 which is set manually to give a desired level of gas flow. Combustion air is derived from a suitable source through a control valve CV8 which is pilot operated by solenoid valve SV11. Control valve CV8 supplies air to valve 224 when solenoid valve SV11 is energised, otherwise air is supplied to valve 225. The outputs of both valves 224 and 225 are fed to the mixer.

Both valves 224 and 225 are set to give a predetermined rate of flow of air, that through valve 224 being the higher, so that the greater heat is developed by the flames 221 when the air is supplied to mixer 222 through valve 224. Solenoid valve SV11 is energised by the output of a conventional ON/OFF temperature controller C1 which is connected to the thermocouple 54 mounted in the mould body 49. If the sensed temperature of the body 49 is lower than a value preset within controller C1, contact C11 closes to energise the coil of valve SV11. If it is higher contact C11 opens. Thus hotter or less hot flames 221 play on the body 49 depending on its temperature, providing conventional ON/OFF control of the temperature.

Figure 11:
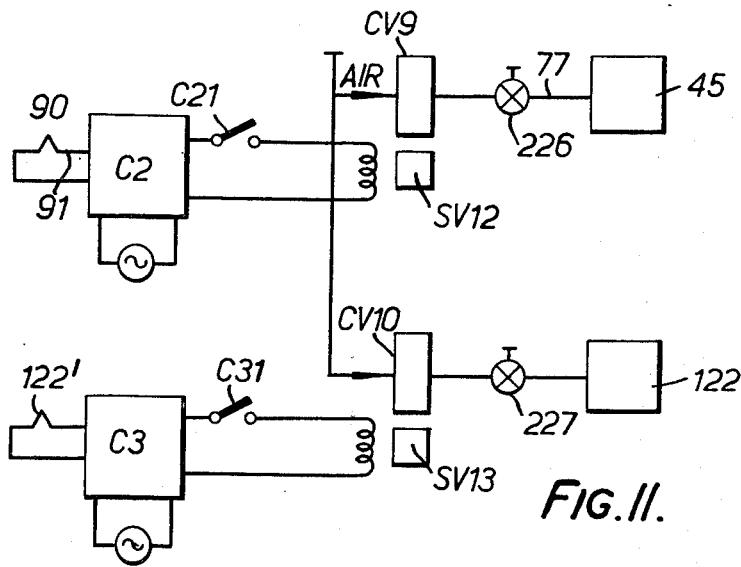
FIG. 11 is a pneumatic circuit diagram illustrating the control of the supply of cooling air to the upper and lower plungers of one of the moulds.

FIG. 11 illustrates the controlled supply of cooling air to the mould plungers 45 and 122. Preset valves 226 and 227 supply air at a controlled rate provided control valves CV9 and CV10 are operated by solenoid valves SV12 and SV13 respectively to connect the valves 226 and 227 to a source of cooling air. The condition of control valve SV12 is controlled in conventional manner by a conventional ON/OFF controller C2 in dependence on the temperature of thermocouple junction 90 to switch the cooling air flow through valve 226 to the plunger 45 ON or OFF depending on whether this temperature is above or below a value preset within controller C2. Similarly controller C3 coupled to thermocouple 122' operates valve SV13 to control the flow of air through valve 227 to the plunger 122.

An electric heating element 16', FIG. 12, in the oil bath is connected in series with make and break contacts R61 of a contactor R6 and a suitable A.C. power source 228. The contacts R61 close when contactor R6 is energised by the operation of contacts C41 of a conventional ON/OFF controller C4, which is coupled to a thermocouple 229 immersed in the oil. In known manner contactor R6 is energised to close its contacts R61 when the temperature sensed by the thermocouple junction 229 is less than a value preset in controller C4.

When moulding spectacle lens blanks from the usual ophthalmic spectacle glass which is a soda-lime-silica glass, the temperature of the mould and the time of closure of the mould is regulated to ensure that the surface temperature of the moulded lens blank has not fallen below about 600°C corresponding to a surface viscosity of at most $10^{10.5}$ poises, and the temperature of the glass at the centre of the thickness of lens blank has not fallen lower than about 700° – 750°C, that is a centre viscosity of at most $10^8$ or $10^7$ poises. Commonly the mould is opened when the glass surface temperature is about 700° to 800°C corresponding to a viscosity in the range of $10^8 – 10^{6.2}$ poises and the centre temperature is about 850° to 950°C corresponding to a viscosity of $10^{5.6}$ to $10^{4.5}$ poises. The moulded blank is then tipped from the mould into the bath of cooling oil in which the blank remains until the surface temperature of the blank has fallen below 550°C corresponding to a surface viscosity of at least $10^{12.5}$ poises.

When moulding blanks with dense flint glass the mould is opened while the surface temperature of the blank is at least 500°C corresponding to a viscosity of $10^{10.5}$ poises and the centre temperature of the blank is about 590°C to 635°C which corresponds to a viscosity of $10^8$ to $10^7$ poises. Commonly the surface temperature is about 600°C to 680°C corresponding to a viscosity of $10^8$ to $10^{6.2}$ poises and the centre temperature is 730°C to 820°C corresponding to a viscosity of $10^{5.6}$ to $10^{4.5}$ poises. The moulded blank remains in the cooling liquid until its surface temperature has fallen to about 450°C corresponding to a viscosity of at least $10^{12.5}$ poises.

When working with Barium crown glass the mould is open before the surface temperature of the moulded blank reaches 630°C corresponding to a viscosity of $10^{10.5}$ poises and while the centre temperature of the blank is still above 705° to 745°C corresponding to a viscosity of $10^8$ to $10^7$ poises. Commonly the surface temperature is about 700° to 785°C corresponding to a viscosity of $10^8$ to $10^{6.2}$ poises and the centre temperature about 825° to 895°C corresponding to a viscosity of $10^{5.6}$ to $10^{4.5}$ poises. The moulded blank remains in the cooling liquid until its surface temperature is below 585°C corresponding to a viscosity of $10^{12.5}$ poises. It has been found that if considerable stresses in the cooled articles are to be avoided, in general the moulded article should be removed from the oil bath within 5 seconds from their immersion in the bath.

Figure 13:
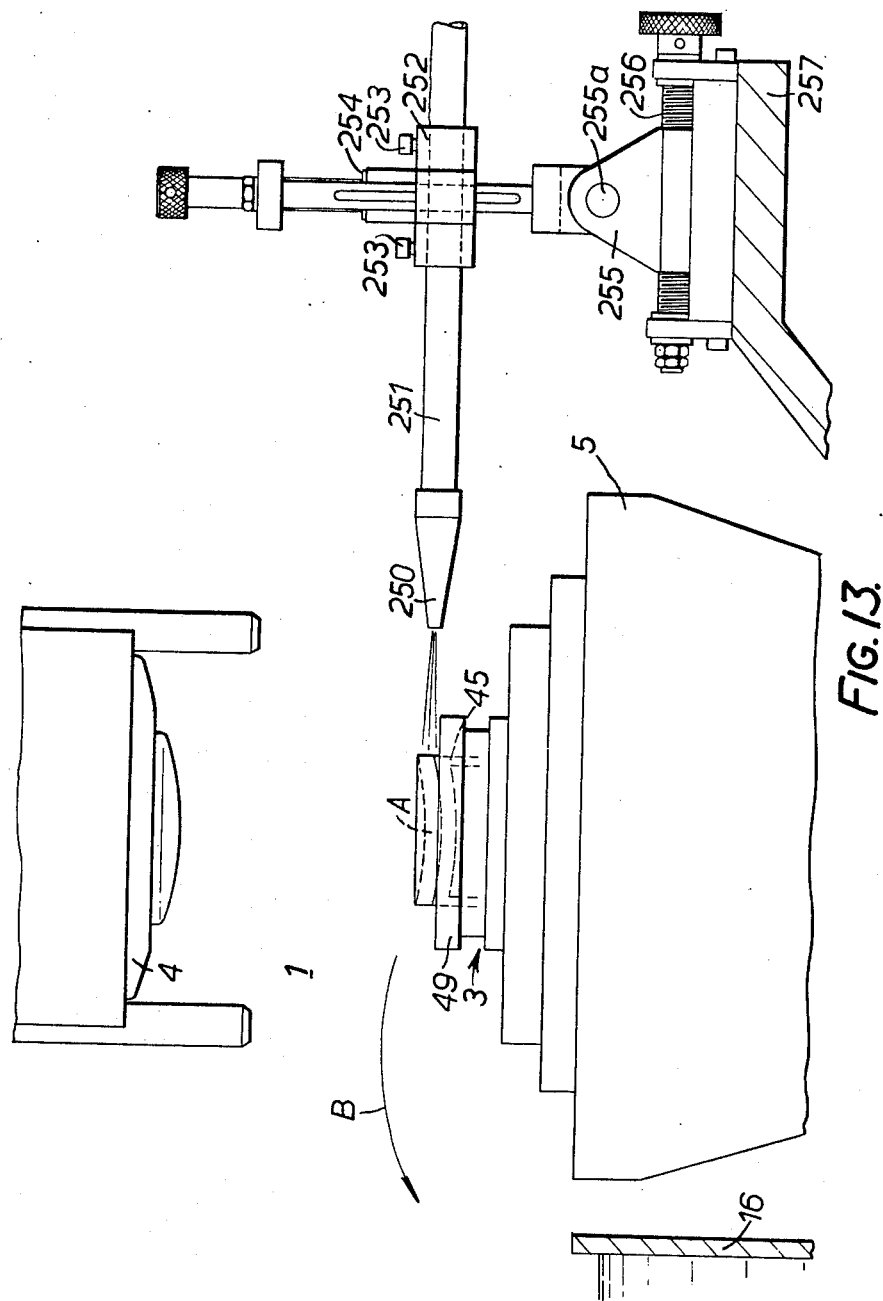
FIG. 13 shows in elevation part of an alternative construction in accordance with the invention including means for transferring the moulded article by blowing.

FIG. 13 shows part of a preferred alternative embodiment in which an air jet is used to transfer the moulded article from the mould instead of tilting the mould about a horizontal axis.

Referring to FIG. 13, there is shown the lower mould part 3 of the mould 1 of an apparatus in most respects very similar to that shown in FIGS. 1 to 6. One important difference is that the press table 5 supporting the mould part 3 is fixed and not rotatable. The lower end of the upper mould part 4 is also shown in its retracted position and will not be described further here as it may be exactly as that shown in FIGS. 1 to 6. For convenience the same reference numerals are used in FIG. 13 as are used for the corresponding parts in FIGS. 1 to 6.

In FIG. 13, the plunger 45 of the lower mould part is shown in part in dotted outline in the position to which it is advanced by operation of the piston and cylinder within the lower mould part 3 as described with reference to FIGS. 1 to 6. In this position the plunger is about level with the top of the mould body 49, so that a lens blank A (shown in section) supported by it projects well above the body 49.

A horizontally directed nozzle 250 is supported beside the mould 1 and is connected by a pipe 251 to a source (not shown) of compressed air, delivering air to the nozzle at a pressure in the range of 0.7 to 4 Kg/cm² for example, approximately 1.4 Kg/cm². The nozzle aperture has a diameter of 3 mm and as shown in rather under 50 mm from the edge of the blank A. The axis of the nozzle is aligned with that diameter of the blank A which lies transverse to the table 5.

The pipe 251 is supported in a sleeve 252 and secured in position by two set screws 253. The sleeve 252 is itself supported by a slide 254 permitting vertical adjustment of the position of the nozzle 250. The slide is supported by a bracket 255 which is in turn mounted on a lead screw 256 supported by a part 259 of the main frame of the apparatus. The slide 254 can be released to pivot about the horizontal axis 255a of bracket 255 to permit adjustment of the angular position of the axis of the pipe 251 and the nozzle 250 whilst the lead screw 256 enables the distance of the nozzle from the blank A to be adjusted.

The electric and pneumatic controls for the apparatus, which are similar in principle to those described with reference to FIGS. 7 to 12, are arranged to operate to blow air for about 0.25 of a second from the nozzle 250 immediately the upper mould part has been lifted clear of the table 5. In the meantime the plunger 45 has been advanced to the position shown in FIG. 13 and the "puff" of air projects the blank A into a trajectory such as that indicated by the arrow B in FIG. 13. The oil tank 16 (shown only fragmentarily in FIG. 13) is in this apparatus positioned beside the quench table 5, to one side of and slightly lower than lower mould part 3 in such a position that the blank A falls freely into the oil within the tank 16. In the tank 16, the blank sinks on to a conveyor which as previously described leads out for example to the conveyor belt of an annealing lehr. The oil is preferably a mineral oil with a flash point about 300°C and is maintained at a temperature in the range of 150°C to 270°C, for example about 200°–220°C. A suitable oil is Cylrex Fm sold by the Mobil Oil Company.

As compared with the apparatus of FIGS. 1 to 6 the cycle time can be made much shorter, since there is not the comparatively long period required in which to rotate the table 5 from its upright to its inverted position and back again. The plunger 45 can be actuated as the upper mould part 4 is withdrawn and blowing of the moulded blank can then take place immediately. All that is then needed to prepare for a new pressing cycle is the return of the plunger 45 to its retracted moulding position.

This speed of operation is in part essential if the forces involved in blowing the blanks A off the plunger are not to deform the blanks A. With a typical soda-lime-silica ophthalmic glass composition, the temperature of the mould and the time of closure of the mould is regulated to ensure that the surface temperature of the moulded lens blank has not fallen below about 600°C corresponding to a surface viscosity of at most $10^{10.5}$ poises, and the temperature of the glass at the centre of the thickness of the lens blank has not fallen below about 700° to 750°C, that is a centre viscosity of at most $10^8$ to $10^7$ poises. In a preferred method of operating, the mould is opened when the glass surface temperature is 700° to 800°C corresponding to a viscosity of $10^8$ to $10^{6.2}$ poises and the centre temperature is 850° to 950°C corresponding to a viscosity of $10^{5.6}$ to $10^{4.5}$ poises. If the blank after moulding is left lying on the plunger 45, the heat in the hotter glass at the centre of the blank will lead to re-heating of the surface. In operating this process it is essential that blow-off takes place before the viscosity of the glass at the surface has fallen below $10^{5.6}$ poises, that is to say the surface temperature has not risen above 850°C for the glass under consideration, and preferably before the viscosity has fallen below $10^7$ to $10^8$ poises (the corresponding temperatures are 750° to 700°C). The rate of re-heat will depend on the size and shape of the blank and the temperature distribution within it immediately after moulding. In general there will be about 1 to 3 seconds available after opening the mould before the surface becomes too soft to permit blowing-off without deformation. In the apparatus described, blow-off was timed to occur 0.25 secs. after opening the mould when the surface viscosity for a 50 gm lens blank was about $10^{6.2}$ poises, the surface viscosity immediately after moulding being $10^{7.0}$ poises, and the centre viscosity about $10^{5.0}$ poises.

Using the apparatus of FIGS. 1 to 6, it is possible to increase the moulding rates as compared with a conventional rotary table press and the arrangement shown in FIG. 13 provides even further improvement. The following Table III shows the moulding rates for a single mould of the type shown in FIG. 13 as compared with a rotary table having 8 lower mould parts co-operating with a single upper mould part, for ophthalmic lens blanks of different weights. It can be seen from this Table that each mould in accordance with FIG. 13 produces well in excess of 10 articles per minute, for example 18 to 30 per minute, whereas in the previously known rotary tables each bottom mould produced only 1 to 4 articles per minute.

TABLE III

| Lens Weight | 8 Mould Rotary Table | | Single Mould Table of Figure 13 | |
|---|---|---|---|---|
| Gms | Cuts/Minute | Glass Processed Kgs/hr | Cuts/Minute | Kgs/hr Glass Processed |
| 20 | 30 | 36 | 30 | 36 |
| 30 | 26 | 46.7 | 26 | 46.7 |
| 40 | 20 | 48 | 21 | 50.4 |
| 50 | 16 | 48 | 20 | 60 |
| 60 | 13 | 46.8 | 20 | 72 |
| 70 | 11 | 46.2 | 18 | 75.6 |

It can also be seen from previous Table II that each mould of FIGS. 1 to 6 provides articles at a rate in excess of 10 per minute, for example 13 to 15 per minute. Whilst no advantage is obtained at lower blank weights, increasing advantages are obtained as the blank weight increases. These are in addition to the advantages of lower capital cost, operational time economies, lower noise level, simpler operating cycles and better product quality resulting from mould temperature control etc. as outlined previously.

Whilst only a single nozzle 250 is shown in FIG. 13, it will be appreciated that more than one nozzle may be employed if required and that the duration of blow and/or the pressure of the air or other gas supplied may be varied to give the required performance with differently shaped glass articles. Articles other than ophthalmic lens blanks may be moulded by a process according to the present invention.

In addition, the nozzle or nozzles may be used other than in the horizontal attitude shown in FIG. 13. With heavier articles it may be necessary to increase the duration of the blow, for example up to about 1.0 sec. and the commencement of the blow may of course be timed later than 0.25 sec. from opening of the mould, provided that the viscosity of the glass on the surface is at least $10^{5.6}$ poises.

To avoid the possibility of forming cold spots on the articles due to the incidence of the air from the nozzle, it may be advisable to heat the air, for example by playing a burner on the pipe 251.

Figure 14:
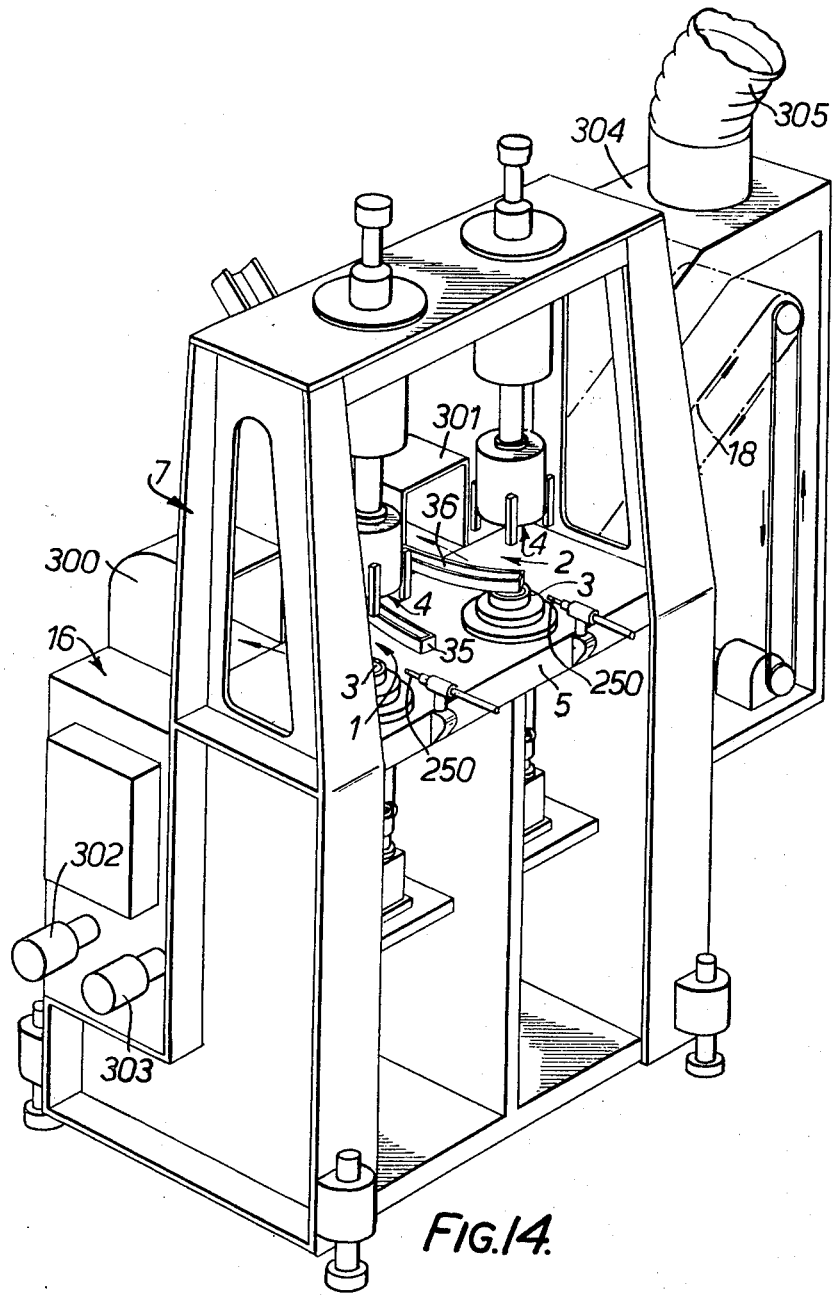
FIG. 14 shows a perspective view of a preferred embodiment generally similar to that of FIG. 13.
Figure 15:
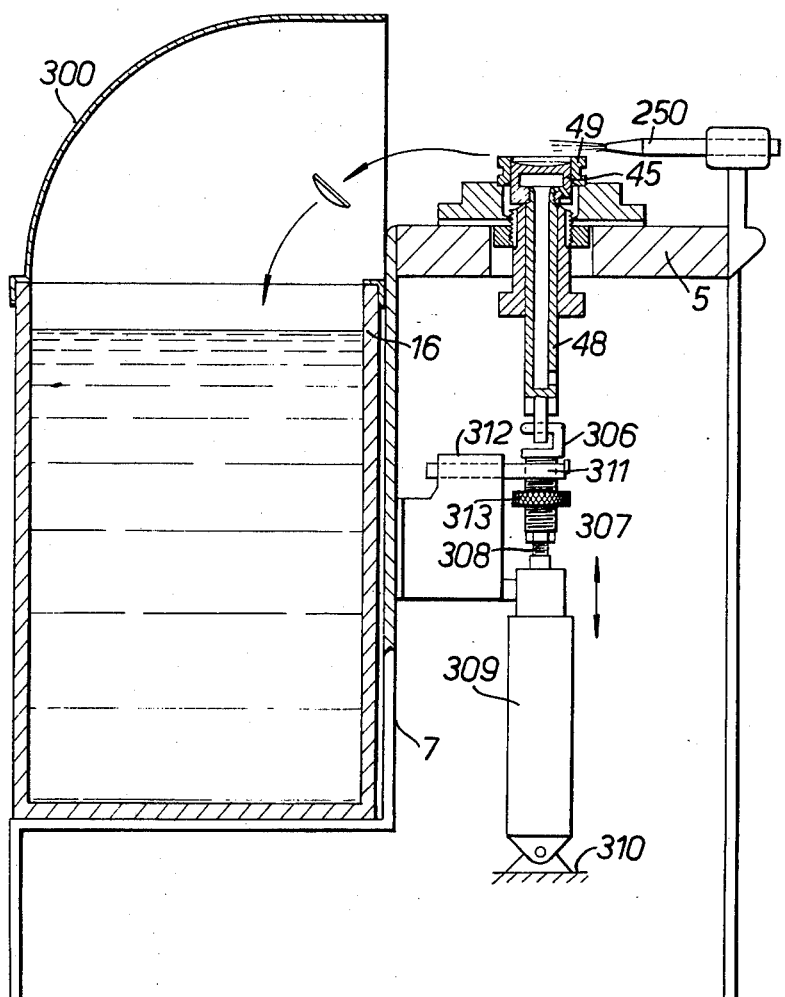
FIG. 15 shows in elevation a lower part of the apparatus of FIG. 14.

A preferred practical construction of apparatus using a mould and blowing arrangement substantially as shown in FIG. 13 is shown in FIGS. 14 and 15. Parts similar to those previously described have been given similar reference numerals and will not be described again. Two similar moulds 1 and 2 are mounted side-by-side on a main frame 7. Each mould has a fixed lower mould part 3 mounted non-rotatably on the press table 5 and each has an associated air nozzle 250 arranged to blow the moulded lens off a plunger 45 (FIG. 15) within the lower mould part into the oil tank 16. Chutes 35 and 36 are provided for delivering gobs of molten glass to the respective moulds. The top of the tank 16 is closed except for two upwardly projecting hoods 300 and 301 through which the lens blanks pass on entering the tank. The tank 16 has two immersion heaters 302 and 303 to control the temperature of the oil within the tank. The conveyor 18 conveying the blanks out of the tank passes through a housing 304 provided with a fume extraction duct 305. As is shown in FIG. 15, the plunger 45, which is hollow, is mounted at the upper end of a hollow vertical stem 48 and allows the circulation of cooling air as was described with reference to FIG. 5. The lower end of the stem 48 is coupled to a hook 306 mounted on an externally threaded coupling rod 307 fixed to a piston rod 308 of a pneumatic cylinder 309. The cylinder 309 is pivotally mounted at its lower end to a fixed plate 310 secured to the main frame 7. A forked stop member 311, which is slideably and interchangeably mounted on a member 312 secured to the frame 7, surrounds the rod 307 and is spaced vertically above a screw threaded collar 313 on the rod 307. The cylinder 309 is provided to raise the plunger 45 and thereby raise a moulded blank into a position at which it may be blown off. The vertical movement of the plunger is limited by engagement of the collar 313 against the stop member 311. The extent of vertical movement may be adjusted by adjusting the position of the collar 313 on the rod 307 or by interchanging the stop member 311 for another of different thickness so as to alter the spacing between the collar 313 and the stop member 311. To insert a different plunger for use in moulding a different article, the hook 306 may be uncoupled from the stem 48 and the cylinder 309 pivoted about the connection at the bottom of the cylinder so as to swing the rod 307 and hook 306 out of the way and allow the stem 48 to be removed.

The operation of the apparatus shown in FIGS. 14 and 15 is the same as that previously described with reference to FIG. 13. It will be seen that the apparatus enables the rapid moulding of a succession of glass articles, each article being moulded at a single station, i.e. each article is formed in a mould which does not move from its fixed station throughout moulding and a good production rate can be obtained from use of a single mould.

When manufacturing moulded lens blanks the stresses induced in the blanks during cooling are not a problem which could cause breakage of the blanks as they are removed from the bath. With lens blanks toughening stresses induced during the cooling are usually advantageous in helping the blanks survive subsequent handling as they are moved on the conveyor from the tank and down the chute on to the conveyor which carries the blanks through the annealing lehr. Unstressed blanks are produced when the stresses are relaxed in the lehr.

If a stressed article is required the article is usually left in the bath for more than 10 seconds before removal and is not annealed. Watch glasses, safety spectacle glasses and headlamp glasses having induced toughening stresses are produced in this way.

Instead of using cooling oil, it may be possible in come cases to use cooling gas.

The method of the invention can also be used for the manufacture of moulded glass tableware, elements of cathode ray tubes in particular cathode ray tube face plates, and moulded hollow glass blocks for architectural use. These articles may be manufactured in annealed or toughened form.

As well as the method described with reference to FIGS. 1 to 6 in which the lower mould part of a vertical press mould is rotated to tip the moulded blank from the mould part and permit free fall of the blank into the cooling medium, the blank may be released from a two or more part mould, the mould parts being separated to allow the moulded blank to drop. A suction head which is accurately shaped to the shape of the upper surface of the moulded blank may be employed to remove the blank from the lower mould part and to transfer the blank to a position in which it is released from the suction head and dropped into the cooling medium. However to achieve shorter cycle times thus enabling high operating rates methods such as those described with reference to FIGS. 13 to 15 are preferred.

The invention may further be applied to a process in which the moulded article, for example a headlamp glass, has a rim. The lower mould part incorporates a ring on which the rim of the article is supported after withdrawal of the rest of the mould parts. The rim of the article is cooler than the rest of the article and is rigid enough to support the article without deformation. The article is then carried on this rim for quenching in a cooling medium which may in this case be cooling air. As alternatives to an oil bath or a molten salt bath, a fluidised bed may be used as the cooling medium. Free fall of a hot blank into a fluidised bed subjects the article to a buoyancy in the same way as a liquid and no deforming forces are applied to the article as it falls through the fluidised bed.

The method and apparatus of the present invention provide considerable advantages. In particular, as described with reference to Tables I and III, higher operating rates are obtainable with heavier gob weights as compared with the known rotary tables.

Further the present invention provides more accurate control of the temperature of parts of the mould thereby reducing sticking and edge checks or cracks.

A further advantage is the economy resulting from the smaller number of expensive moulding tools, that is the mould parts, only two complete moulds being necessary in the apparatus described for moulding articles at a faster rate than was possible with the many mould parts employed in a rotary pressing apparatus. It has been found for example that with the smaller number of moulds employed in the apparatus of the present invention a complete change of moulds can take place in for example 10 minutes as compared with for example the 40 minutes which it would take to change the moulds on a conventional eight mould rotary machine.

Further the period for warming up the apparatus is considerably reduced with the apparatus of the present invention. For example a warming up period for producing acceptable ophthalmic lens blanks starting from the moulds at room temperature is about 10 minutes, as compared with a 50 minute warming up period which has been found necessary with a conventional rotary eight mould table machine in order to achieve operation to the desired dimensional specification.

We claim:

1. In a method of press moulding a glass article by feeding a gob of molten glass into an open mould, closing the mould to form the article to the required shape, opening the mould after forming the article, removing the article from the open mould when it has cooled to a desired condition, and then further cooling the article after removal from the mould, the improvement of reducing the time of moulding the article comprising:

regulating the temperature of the mould and time of closure of the mould so that moulding to form the article to the required shape is complete while the moulded glass is in a state of thermal inhomogeneity such that the viscosity of the glass of the surface of the moulded article is at most $10^{10.5}$ poises and the viscosity of the glass at the center of the thickness of the article is at most $10^8$ poises and substantially less than that at its surface;

opening the mould and rapidly transferring the article, while the surface viscosity and viscosity at the centre of thickness of the article are substantially different such that the article still has thermal inhomogeneity, directly into a cooling medium, avoiding forces which cause deformation of the shaped article during its transfer from the mould into the cooling medium, said transfer of the thermally inhomogeneous article being accomplished while the surface viscosity of the article is at least $10^{5.6}$ poises and at most $10^{10.5}$ poises and substantially greater than at its center of thickness; and regulating the heat transfer from the article to the cooling medium to cool the article rapidly to a temperature at which its surface viscosity is at least $10^{12.5}$ poises.

2. A method according to claim 1, in which the viscosity of the glass at the centre of the thickness of the article is at most $10^7$ poises when moulding is complete.

3. A method according to claim 1, comprising regulating the mould temperature and the time of closure of the mould to ensure that the surface viscosity of the moulded article is at most $10^8$ poises and the centre viscosity is at most $10^5$ poises, before transferring the article to the cooling medium.

4. A method according to claim 1, comprising ejecting the moulded article from the open mould, and permitting the ejected article to fall freely into a body of cooling liquid constituting said cooling medium.

5. A method according to claim 4, wherein the cooling liquid is a mineral oil having a flash point above 300°C.

6. A method according to claim 4, wherein the cooling liquid comprises molten inorganic salts.

7. A method according to claim 1 wherein the glass article is vertically press moulded, the mould opening step comprises opening the mould leaving the whole undersurface of the moulded article supported on a lower part of the mould, and transfer of the moulded article from the mould to the cooling medium comprises rotating said lower mould part about a horizontal axis to tip the article from the lower mould part into a body of cooling liquid constituting said cooling medium.

8. A method according to claim 7, comprising sensing the temperature of the part of the mould supporting the moulded article, and regulating cooling of that mould part under control of the sensed temperature.

9. A method according to claim 7, comprising sensing the temperature of the part of the mould constituting an upstanding mould wall defining the outer dimensions of the moulded article, and regulating heating of the mould wall under control of the sensed temperature.

10. A method according to claim 1, wherein the cooling medium is provided by at least one stream of gas.

11. A method of moulding glass lens blanks according to claim 1, wherein successive gobs of said molten glass are alternately fed from a common supply to two alternating press moulding stations, a lens blank is formed by moulding at one station while feeding a gob to the other station, and each moulded lens blank article is rapidly transferred directly, while the viscosity of the glass of the surface of the article is at most $10^{10.5}$ poises and the viscosity of the glass at the center of the thickness of the article is at most $10^8$ poises, directly into a bath of cooling liquid below the moulding stations to cool the lens blanks rapidly to a temperature at which their surface viscosity is at least $10^{12.5}$ poises.

12. A method according to claim 1 wherein the transfer of the moulded article from the mould to the cooling medium is effected by blowing the article from a support forming part of the mould with a jet of gas and allowing the article to follow a free trajectory to the cooling medium.

13. A method according to claim 12, in which the article is raised on said support, when the mould is opened, to an exposed position adjacent a gas jet so that the article is blown sideways off the support.

14. A method according to claim 12, in which the gas jet comprises one or more jets of compressed air.

15. A method according to claim 12, in which the viscosity of the glass is at least $10^{5.6}$ poises when the article is subjected to the gas jet.

16. A method according to claim 15, in which the viscosity of the glass is at least $10^7$ poises when the article is subjected to the gas jet.

17. A method of moulding a succession of glass articles according to claim 1 wherein the moulding of each article is carried out at a station comprising single top and bottom moulds which cooperate in moulding every article passing through the station and in which articles are moulded at a rate in excess of 10 per minute.

18. A method according to claim 1 wherein the transfer of the moulded article from the mould to the cooling medium is effected by tipping the article out of the mould and allowing it to fall freely into the cooling medium.

* * * * *